United States Patent [19]

Batterman et al.

[11] Patent Number: 5,223,701
[45] Date of Patent: Jun. 29, 1993

[54] SYSTEM METHOD AND APPARATUS USING MULTIPLE RESOLUTION MACHINE READABLE SYMBOLS

[75] Inventors: Eric P. Batterman, East Amwell; Donald G. Chandler, Princeton, both of N.J.

[73] Assignee: Ommiplanar Inc., Princeton, N.J.

[21] Appl. No.: 829,147

[22] Filed: Jan. 31, 1992

Related U.S. Application Data

[63] Continuation of Ser. No. 606,009, Oct. 30, 1990, Pat. No. 5,153,418.

[51] Int. Cl.$^5$ .................. G06K 7/10; G06K 9/36; G06K 19/00; G06K 19/06
[52] U.S. Cl. .................. 235/494; 235/456; 380/51; 382/56
[58] Field of Search .......... 235/494, 456, 454; 380/51; 382/56

[56] References Cited

U.S. PATENT DOCUMENTS

| | | | |
|---|---|---|---|
| 3,453,419 | 7/1969 | Torrey | 235/437 |
| 3,544,771 | 12/1970 | O'Meara | 382/10 |
| 3,553,438 | 1/1971 | Blitz et al. | 235/464 |
| 3,776,454 | 12/1973 | Jones | 235/494 |
| 3,898,434 | 8/1975 | Bigelow et al. | 235/494 |
| 3,916,160 | 10/1975 | Russo et al. | 235/494 |
| 3,959,631 | 5/1976 | Otten | 235/493 |
| 3,971,917 | 7/1976 | Maddox et al. | 235/467 |
| 4,263,504 | 4/1981 | Thomas | 235/454 |
| 4,286,146 | 8/1981 | Uno et al. | 235/456 |
| 4,439,762 | 3/1984 | Salaman | 235/463 |
| 4,476,382 | 10/1984 | White | 235/491 |
| 4,488,679 | 12/1984 | Brockholt et al. | 235/469 |
| 4,579,370 | 3/1986 | Corwin et al. | 283/72 |
| 4,634,850 | 1/1987 | Pierce et al. | 235/487 |
| 4,641,346 | 2/1987 | Clark et al. | 380/3 |
| 4,641,347 | 2/1987 | Clark et al. | 380/3 |
| 4,654,718 | 3/1987 | Sueyoshi | 358/257 |
| 4,660,221 | 4/1987 | Dlugos | 380/23 |
| 4,814,594 | 3/1989 | Drexler | 235/487 |
| 4,864,618 | 9/1989 | Wright | 380/51 |
| 4,874,936 | 10/1989 | Chandler et al. | 235/494 |
| 4,924,521 | 5/1990 | Dinan et al. | 382/54 |
| 4,926,035 | 5/1990 | Fujisaki | 235/494 |
| 4,939,354 | 7/1990 | Priddy et al. | 235/456 |
| 4,944,023 | 7/1990 | Imao et al. | 382/37 |
| 4,949,381 | 8/1990 | Pastor | 380/51 |
| 4,958,064 | 9/1990 | Kirkpatrick | 235/384 |
| 4,972,497 | 11/1990 | Saito et al. | 382/56 |
| 4,998,010 | 3/1991 | Chandler et al. | 235/494 |

FOREIGN PATENT DOCUMENTS 63-298589 12/1988 Japan.
1-053286 3/1989 Japan.

OTHER PUBLICATIONS

Notebook Entry of Donald G. Chandler dated Jun. 22 and 23, 1987 while employed by Pa Technology on a Project for the benefit of United Parcel Service (UPS).

Primary Examiner—Eugene R. LaRoche
Assistant Examiner—Christopher R. Glembocki
Attorney, Agent, or Firm—Allan Jacobson

[57] ABSTRACT

A multiple resolution optically encoded label is readable at two or more optical resolutions, and is able to store two or more respective channels of optically encode information. Low resolution information is encoded in a plurality of large cells arranged in a predetermined geometric pattern. Each of the large cells includes a plurality of smaller cells for storing high resolution information. Method and apparatus are disclosed for encoding both high resolution data, and low resolution data, as well as for finding and reading both high resolution and low resolution data.

38 Claims, 15 Drawing Sheets

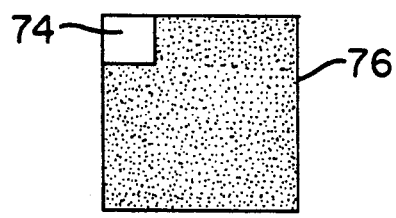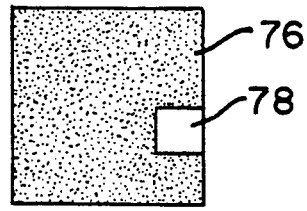
FIG. 8A
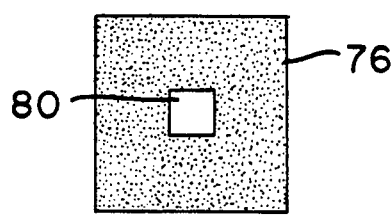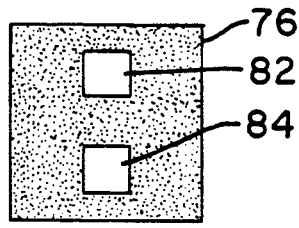
FIG. 8B
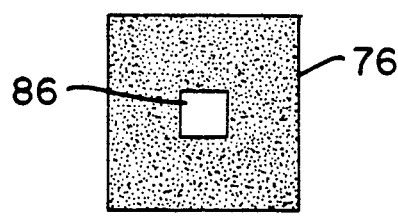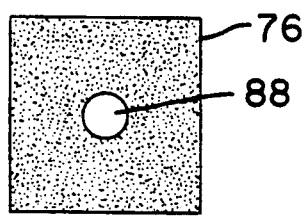
FIG. 8C
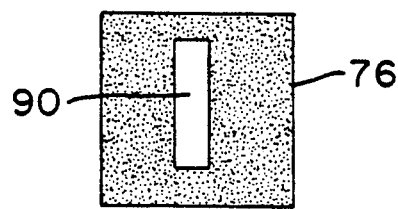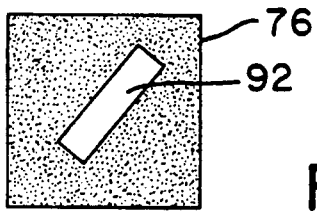
FIG. 8D
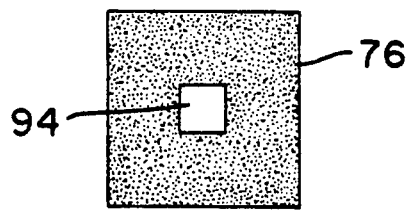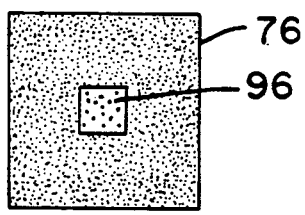
FIG. 8E
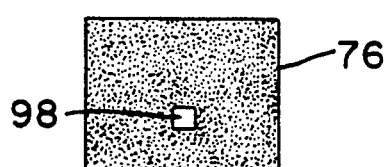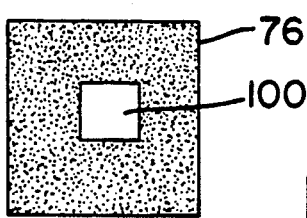
FIG. 8F

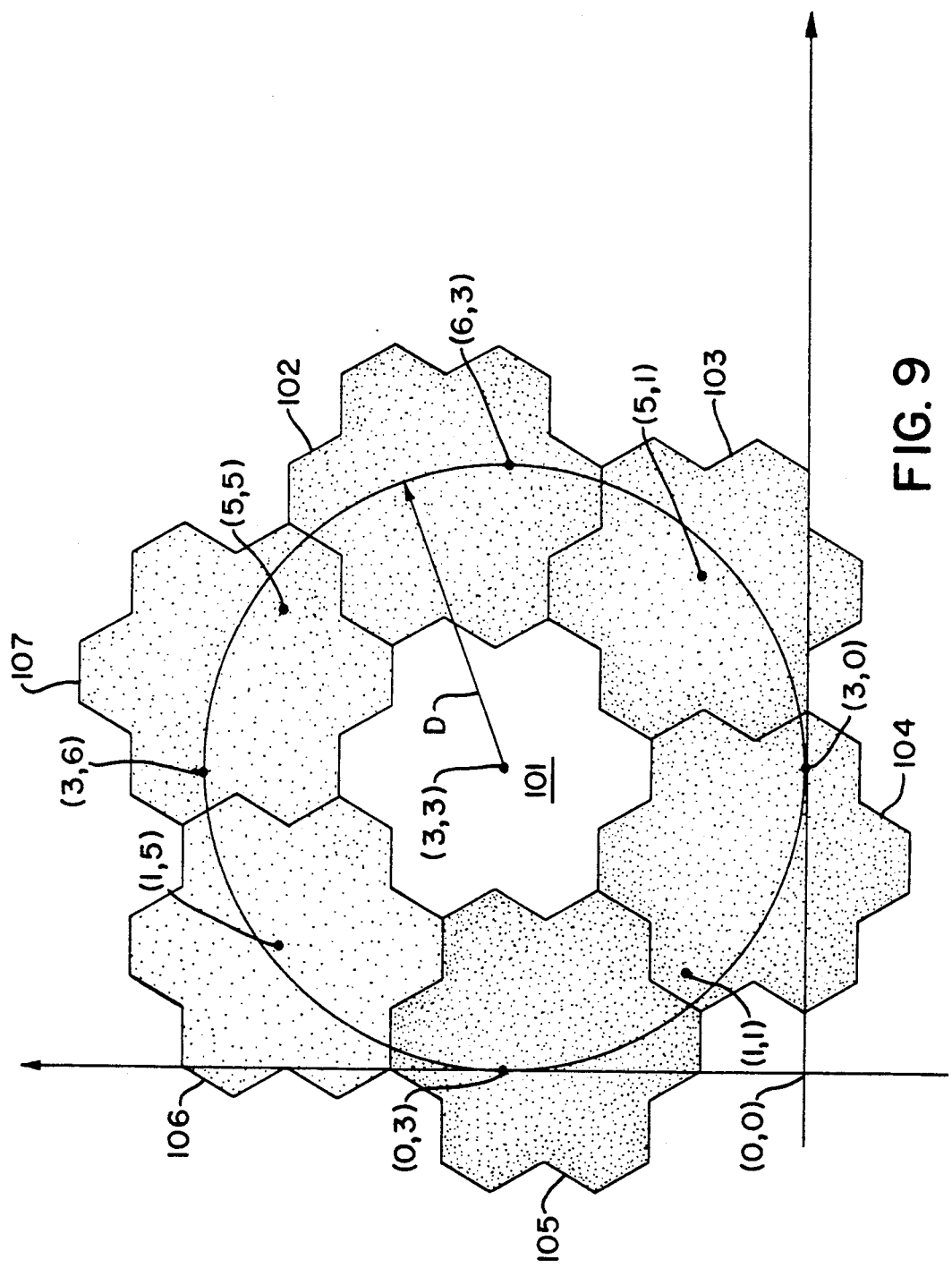

SYSTEM METHOD AND APPARATUS USING MULTIPLE RESOLUTION MACHINE READABLE SYMBOLS

This is a continuation of co-pending application Ser. No. 606,009, filed on Oct. 30, 1990 now U.S Pat. No. 5,153,148.

FIELD OF THE INVENTION

This invention relates to the field machine of readable symbols, and particularly, this invention relates to an optically readable label for storing optically encoded information readable at multiple optical resolutions.

BACKGROUND OF THE INVENTION

Optically encoded labels using machine readable symbols are well known. For example, U.S. Pat. No. 3,553,438 shows an optically encoded label using a circular wedge data format. U.S. Pat. Nos. 3,971,917 and 3,916,160 show machine readable labels using concentric ring codes to represent stored data. Other types of machine readable labels, such as labels having data encoded in an array of rectangular grids as shown in U.S. Pat. No. 4,286,146, or labels having data encoded in the form of microscopic spot grids as shown in U.S. Pat. No. 4,634,850, are well known in the prior art. In another instance, U.S. Pat. No. 4,488,679 shows an optically encoded label using densely packed multi-colored data.

Other types of machine readable symbols have been developed for many applications. For example, the universal product code (UPC) is a bar code symbology widely used in the U.S. retail industry to identify products at the point of sale, or for inventory control purposes. A bar code is a particular type of machine readable symbol in which data is represented as a series of parallel solid lines, or bars, of varying width and spacing. In the industrial area, other bar codes symbologies have been used for package identification systems. Common bar code symbologies include CODABAR, code 39, interleaved 2 of 5 and code 49.

Existing bar code systems typically lack sufficient data density to accommodate the increasing need to encode more information. It is also desirable to reduce label size, which makes it even more difficult to encode more information. For example, in a package sorting operation, a minimum system requires an optically encoded label containing at least a destination code, such as a zip code of 5 to 9 characters.

However, it is also desirable for the same label to encode additional information such as the name, address and telephone number of the addressee, as well as the class of service, shipper identification, and the like. Increasing the size of the label in order to accommodate more encoded data is not an adequate solution. First, small packages must be sorted as well as large ones, which places rigid constraints on the maximum allowable label size. Second, increasing the label size increases the label cost, which is a significant factor in high volume operations.

The alternative to increasing the label size is to fit more data on the same size label. However, to fit more data on the same size label, the size of the optically encoded features must be reduced. For example, in the case of a bar code label, the bar code size and spacing is reduced in order to encode more data on the same size label.

However, a reduction in bar code size requires significant increases in optical resolution, printing accuracy, illumination power, mechanical complexity, and processing speed. The system resulting from a high density, high speed bar code symbology tends to become both technically and economically impractical.

Higher density machine readable labels containing data arrays instead of bar codes are known. A prior art example of a label containing a higher density data array is shown in U.S. Pat. Nos. 4,874,936 and 4,896,029 where data is encoded in the form of an hexagonal data cell array that contains about 100 characters of information. The prior art hexagonal array system requires a scanner and decoder of sufficient resolution to find, digitize and decode the high density data contained in the label. Due to the small optical features of the label, the prior art hexagonal array system also requires the use of powerful illumination, a high resolution imager, a means for sensing the distance of the label from the imager, and a variable focus lens in order to acquire the image, all of which results in a technically complex and expensive system.

SUMMARY OF THE INVENTION

The present inventors have noted that in many applications for high density data encoded labels, some of the encoded information is more important than the other encoded information. For example, continuing the example of package sorting, the destination code is more important, i.e. has a higher priority, than for example, the shipper identification data. The high priority information, which is required for sorting operations, is critical to system operation and is more frequently used than is the low priority information.

In the prior art example of hexagonal data cell arrays disclosed in U.S. Pat. Nos. 4,874,936 and 4,896,029, cited above, the disclosed label contains a high priority message a low priority message. In the prior art system, the high priority message data is better protected in terms of error correction and by physical proximity to the center of the label, where it is less likely to be damaged. However, in the prior art, the size of the optical features of the high priority message data is the same size as the optical features of the low priority message data. Therefore, the prior system for reading the label needs to have sufficient resolution and processing power necessary to capture, digitize and decode all of the information present in the label even when a small subset of the information in the label is all that is needed.

The present invention is embodied in a machine readable, optically encoded label readable at two or more optical resolutions for storing two or more respective channels of optically encoded information. In one embodiment of the present invention, an optically encoded label comprises at least a first data cell, and a plurality of second data cells, wherein each of the second data cells is smaller than said first data cell. A number of the smaller second cells may be contained within the space occupied by the larger first data cell.

Typically, the larger first data cells encode a higher priority of message data, while the smaller second data cells encode a lower priority of message data. To read the large cells, the label is processed using low resolution image data, while to read the small cells, the label is processed using high resolution image data. Since the smaller high resolution data cells may be superimposed within the larger low resolution data cells, label area is conserved.

The use of multiple resolution optically encoded labels improves the speed and ease of reading high priority data. For example, in the package sorting example cited above, a parcel may have zip code data encoded in the large data cells, which is then reliably and rapidly read at low resolution at many different locations, e.g. at many sorting stations while traveling at very high conveyor belt speeds. The small data cells may encode package identification, destination address, class of service, shipper identification and the like, which need not be read at every sorting location.

The typical sorting station reader is required to read the large cell zip code data only. Thus, sorting station readers would be simplified, permitting the use of a low resolution imager and fixed focus optics which in turn reduces the required system image memory and necessary data processing speeds.

At other optical read stations, where high resolution low priority data (e.g. shipper identification, etc.) is needed, a high resolution reader can be used to read the high resolution data contained in the smaller data cells In many cases, the high resolution reader may be a low volume type of reader such as a handheld reader, wherein high resolution image processing is easier to implement than in a high speed conveyor belt reader.

Finally, the use of multiple resolution optically encoded labels in accordance with the present invention permits a complex optical reader system to be deployed in stages. In the first stage, only low resolution labels and low resolution readers are used for basic system functions, in this case, for sorting packages. For the first stage, labels containing only low resolution data are easier to print.

At a later stage, printed labels would also contain high resolution data, and high resolution readers would then be deployed whenever needed. The low resolution reader previously installed would not become obsolete since the low resolution readers ca still read the low resolution information of the multiple resolution optically encoded label.

DESCRIPTION OF THE DRAWINGS

FIGS. 8a through 8f illustrate alternative embodiments of multiple resolution optically encoded data cells in accordance with present invention.

FIG. 9 is a detail illustration of a single finder pattern spot for use in conjunction with the present invention.

DETAILED DESCRIPTION

Figure 1:
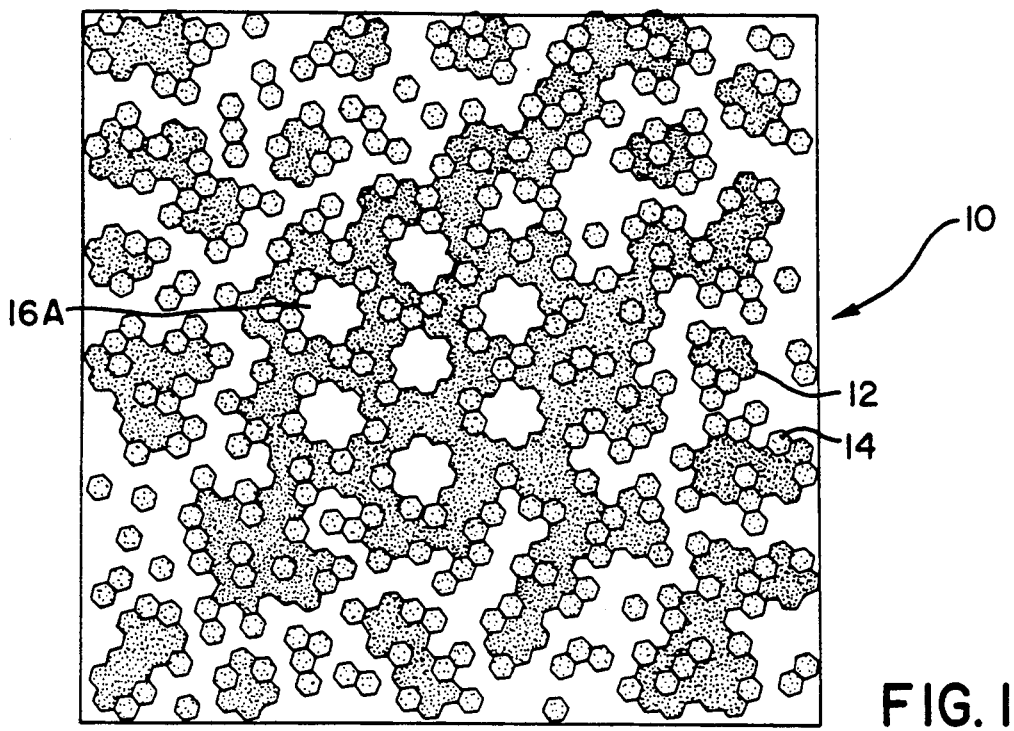
FIG. 1 illustrates a multiple resolution optically encoded label in accordance with the present invention.

A multiple resolution optically encoded label 10 is shown in FIG. 1. The label 10 includes 7 white finder spots, such as spot 16a. Data is encoded in the label in the form of low resolution encoded cells, such as cell 12 and high resolution encoded cells, such as cell 14.

Figure 2:
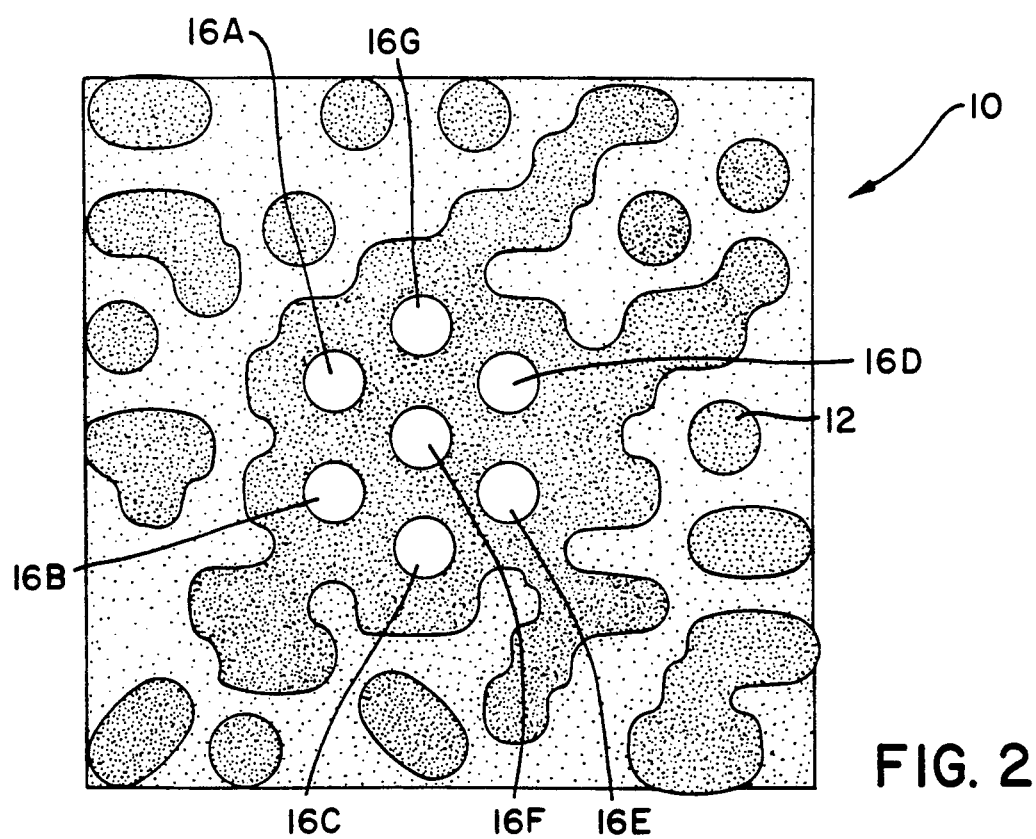
FIG. 2 illustrates a multiple resolution optically encoded label of the present invention viewed at low resolution.

At low resolution, the label of FIG. 1 appears as shown in FIG. 2. At low resolution, the high resolution encoded cell 14 is not visible. However, at low resolution, the low resolution data cell 12 is visible and appears as a dark cell. Seven finder pattern spots 16a through 16f, viewed at low resolution, are visible as light cells.

Figure 3A:
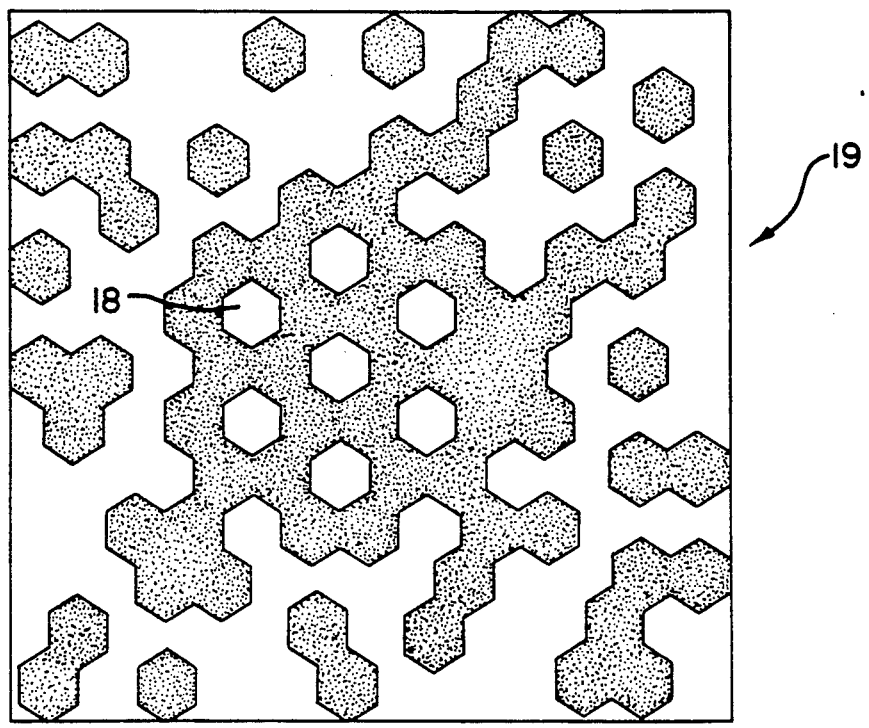
FIGS. 3a and 3b show various cell shapes which may be used in a multiple resolution optically encoded label in accordance with the present invention.
Figure 3B:
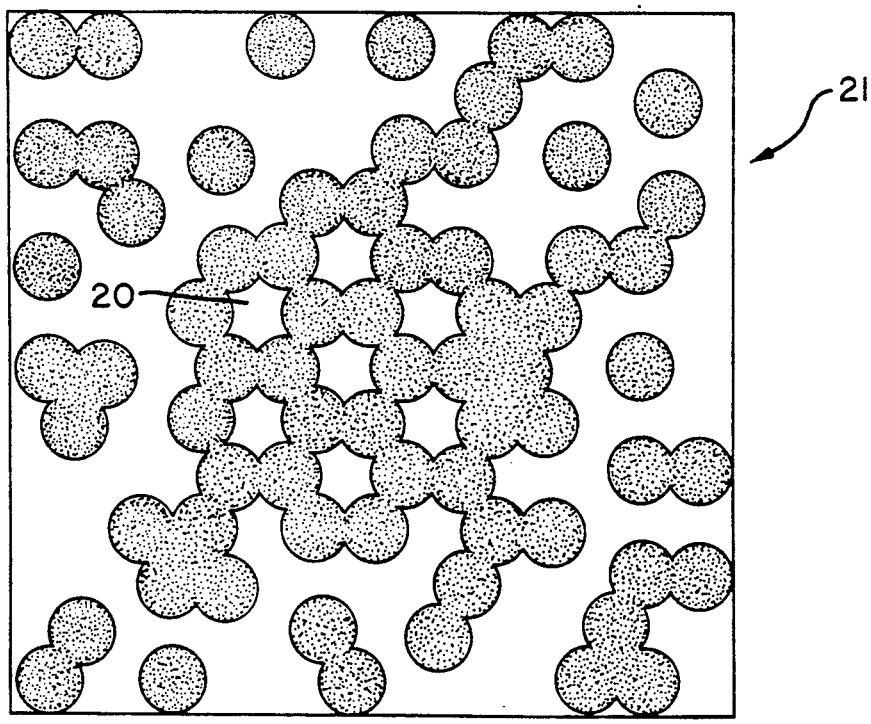

In FIG. 3a, a label 19 is illustrated using hexagonally shaped large data cells for encoding low resolution information. A finder spot 18, one of 7 finder spots, is also shown having a generally hexagonal shape. In FIG. 3b, a label 21 having low resolution encoded information in the form of circular cells as shown. In this case a finder spot 20, one of 7 finder spots, is formed by the 6 circular low resolution dark data cells surrounding finder spot 20.

Figure 4A:
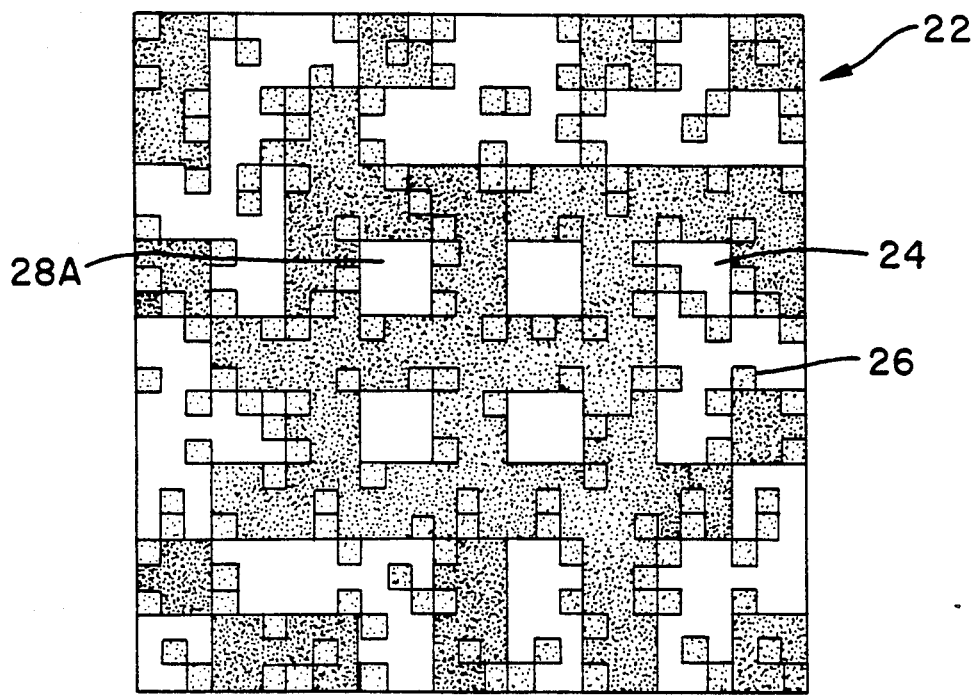
FIG. 4a illustrates a multiple resolution optically encoded label in accordance with the present invention using a generally rectangular geometric array of rectangular data cells.

An alternative embodiment of a multiple resolution optically encoded label 22 is shown in FIG. 4a. The label 22 contains low resolution encoded data cells, such as cell 24, and at the same time includes high resolution encoded data cells, such as cell 26.

Figure 4B:
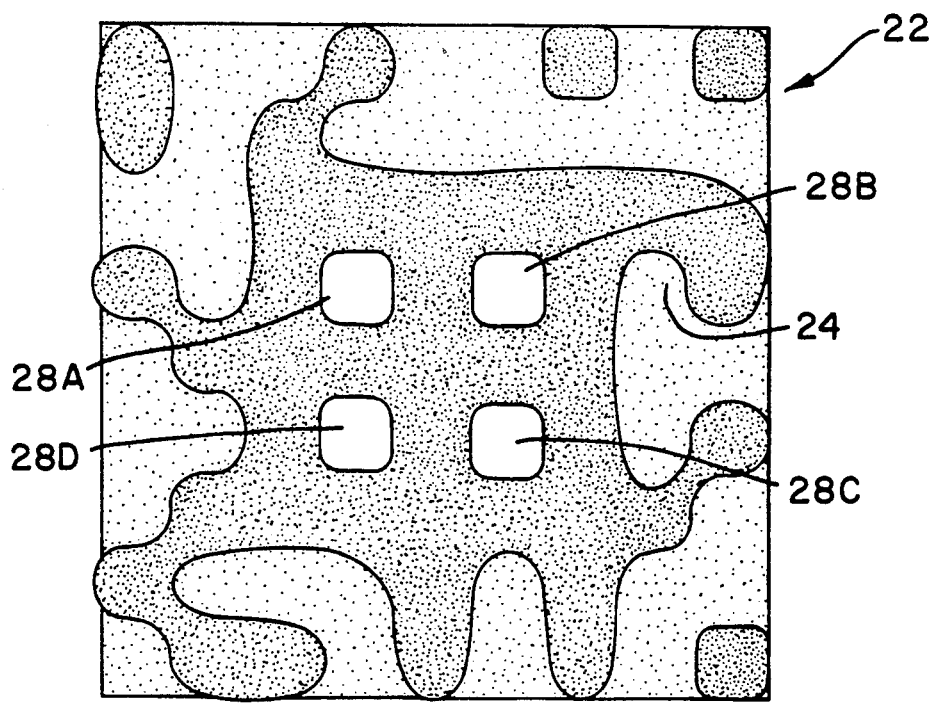
FIG. 4b is a multiple resolution optically encoded label of FIG. 4a when viewed at low resolution in accordance with the present invention.

When viewed at low resolution, the label of FIG. 4a appears as shown in FIG. 4b. At low resolution, the high resolution data cell 26 is not visible. However, at low resolution, the low resolution data cell 24 is visible and appears as a light cell. Four finder pattern spots 28a through 28d, viewed at low resolution, are visible as light cells.

Figure 5A:
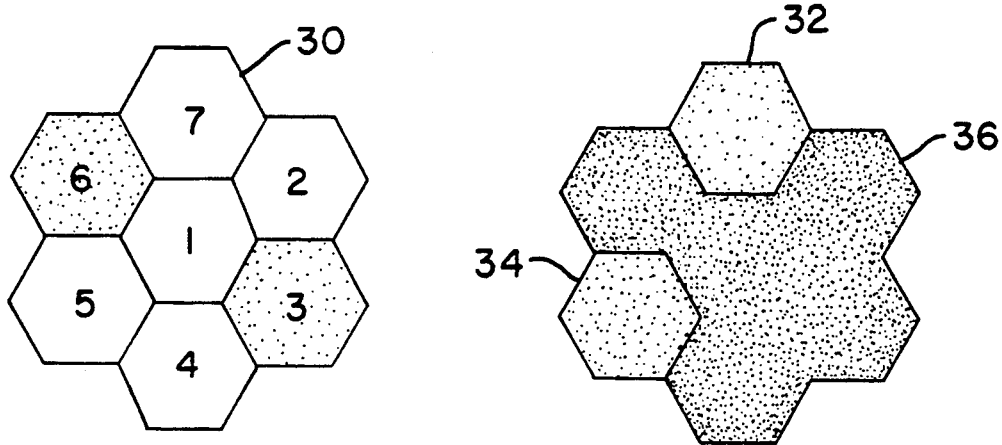
FIGS. 5a, 5b, and 5c illustrate high resolution encoding techniques in accordance with the present invention.

A preferred embodiment of an optically encoded label illustrating the manner in which high resolution data is encoded on the same label area as low resolution data, is shown in FIG. 5a. A large cell 30 contains two contrasting small cells, or subcells. The small cells can be in any of the positions 1 through 7. High resolution information is encoded by the position of the two contrasting small cells within the large cell 30. In particular, cell 3 and cell 6, have a contrasting optical property as compared to the large cell 30. Similarly, cells and 34 have a contrasting optical property as compared to the large cell 36, but are placed at different small cell positions.

Specifically, there are 21 possible combinations for placement of two cells out of 7 having a contrasting optical property. Therefore, each low resolution large cell can encode an additional 4.39 bits of information (logarithm base 2, of 21).

The small cells within a large cell should be limited in size and number to keep the optical property of the large cells from changing appreciably Therefore, during processing of the large data cells, only the large cell low resolution image data is processed, at which time the small cell high resolution image data is not visible so as to not interfere with the decoding of the large cell low resolution image data.

To maximize the readability of the high resolution information, cells 3 and 6 could be made black while remainder of the large cell be made white. However, at low resolution, it is desired that the low resolution cell 30 appear as though completely white or black. Therefore, it is preferable that cell 3 and cell 6 be somewhere intermediate on the grey scale between black and white in order to aid in the reliable reading of low resolution data.

For example, large cell 36 will appear as a black cell at low resolution. High resolution small cell 32 and small cell 34 have a contrasting optical property somewhere intermediate on the grey scale between black and white. Thus, the contrasting optical property of the small cells should be sufficient to permit the reading of high resolution data, while not appreciably changing the optical property of the large cell 36 when viewed at low resolution.

Figure 5B:
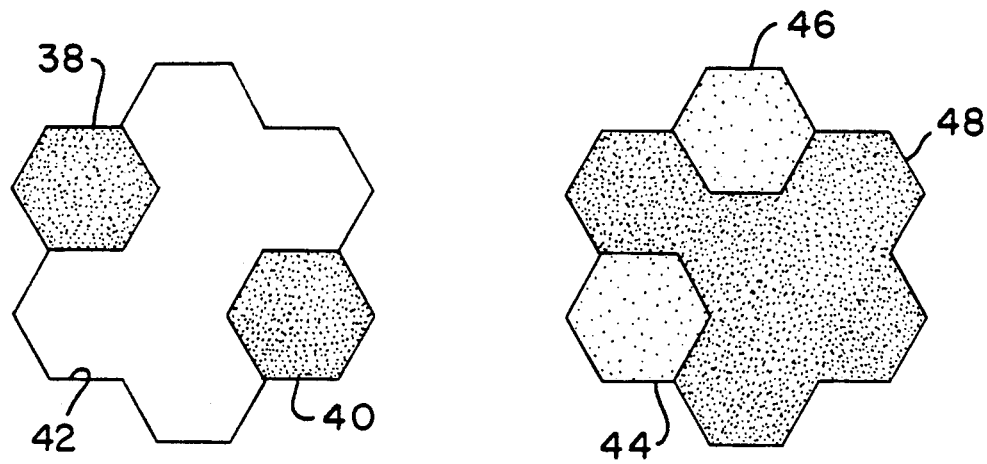
Figure 5C:
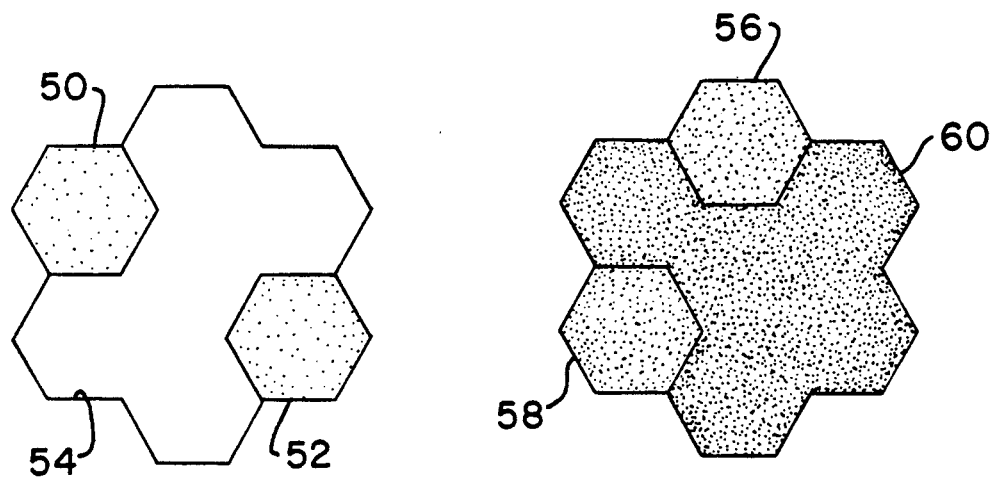

FIG. 5b shows how the optical property of the small cells may be further optimized for certain situations. In FIG. 5a the contrasting optical property of the small cells 3, 6, 32, 34 are the same grey value for large white cell 30 as for large dark cell 36. However, as shown in FIG. 5b, it may be desirable to use light grey small cells 44 and 46 within a large dark cell 48, and dark grey small cells 38 and 40 within a large cell 42 in order to increase the contrast of the small cell to the large cell. Conversely, as shown in FIG. 5c, if it is desired to increase the contrast between large cells, i.e. the optical property of large cell compared to other large cells, then dark grey small cells 56 and 58 may be used within a large dark cell 60, and light grey small cells 50 and 52 may be used within a large light cell 54. The choice of grey scale optical value of the small cells is a balance between the ease of reading the high resolution data cell, or the ease of reading the low resolution data cell.

In any event, the position of the small cells within the large cell encodes the high resolution information, while the optical property of the large cell viewed at low resolution, including the contribution of the small cells, determines the value of the large cells. Since there are always two small cells within each of the large cells for all values of encoded data, the optical property of the large cells viewed at low resolution does not change appreciably for different encoding of the small cell high resolution data.

The total information content of one large cell includes 4.39 bits of small cell information plus 1 bit of large cell information, or a total of 5.39 bits, compared to the 7 bits which could be encoded if only a high resolution black and white system was used. Due to the enhanced data reliability of the large cells and the consequent reduced need for error correction, the data density achieved by the multiple resolution optical encoded label of the present invention is comparable to the data density of prior art high resolution systems, while providing the additional advantages of multiple resolution encoding.

Other embodiments of multiple resolution encoding is shown in FIGS. 8a through 8f. The high resolution information is encoded within low resolution data cells based on the position, number, shape, orientation, optical property, or size of the low resolution data cell.

For example, FIG. 8a shows how high resolution information can be encoded by placing a small contrasting cell 74 at different cell position 78 within the large low resolution cell 76. FIG. 8b shows how high resolution information can be encoded by placing varying numbers of small contrasting cells, i.e. a single cell 80 or two small cells 82 and 84 within a large low resolution cell 76. FIG. 8c shows how high resolution information can be encoded by placing small contrasting cells of different shapes within the large cell 76, such as square cell 86 or circular cell 88. FIG. 8d shows how high resolution information can be encoded by changing the orientation of a small contrasting cell 90 within the large low resolution cell 76, i.e. at a 45 degree angle shown by the position of cell 92. FIG. 8e shows high resolution information encoded by placing small contrasting cells of different optical properties such as light cell 94 or grey cell 96 within the large low resolution cell 76. Finally, FIG. 8f shows high resolution information encoded by placing a contrasting cell of different size such as a small square 98 or a larger square 100 within the large low resolution cell 76. Various combinations of the foregoing methods of encoding may be used, as for example, by varying the number of small cells and at varying positions.

Figure 6A:
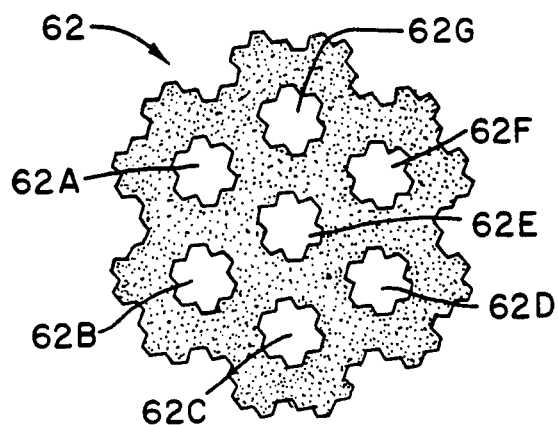
FIGS. 6a, 6b, and 6c illustrate various forms of finder patterns for use in conjunction with the present invention.
Figure 6B:
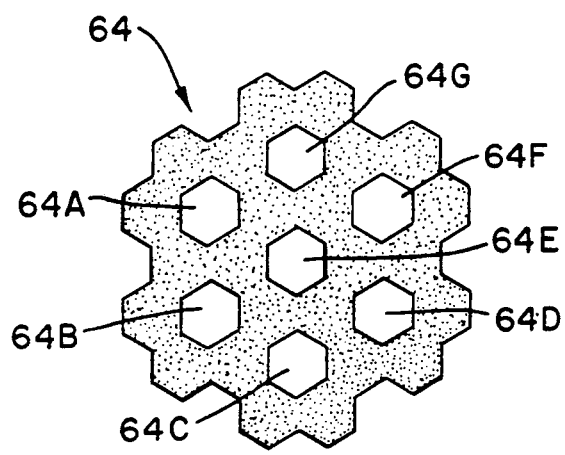
Figure 6C:
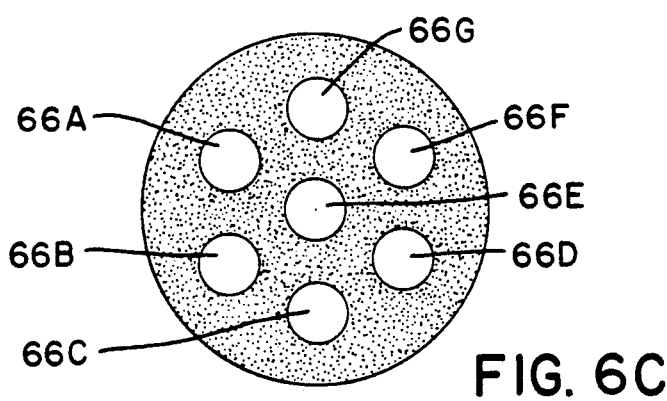

As will be recalled, the finder pattern consists of an array of 7 spots arranged in a hexagonal geometric pattern. Specifically, FIG. 6A shows the finder pattern 62 for use in conjunction with the present embodiment, when viewed at low resolution. The finder pattern 62 consists of 7 spots, 62a through 62g, which are at the 6 points at the vertices of a regular hexagon plus the center point. Alternative finder patterns are shown in FIG. 6b wherein a finder pattern 64 consists of 7 hexagonal spots 64a through 64g, and in FIG. 6C wherein the finder pattern may alternatively consist of 6 circular spots 66a through 66g. A finder pattern, which is composed of a predetermined geometric array of large data cells provides a pattern which is easy to distinguish from common backgrounds, provides some label orientation information, and also provides large cell to large cell spacing information useful in the decoding process.

Figure 10:
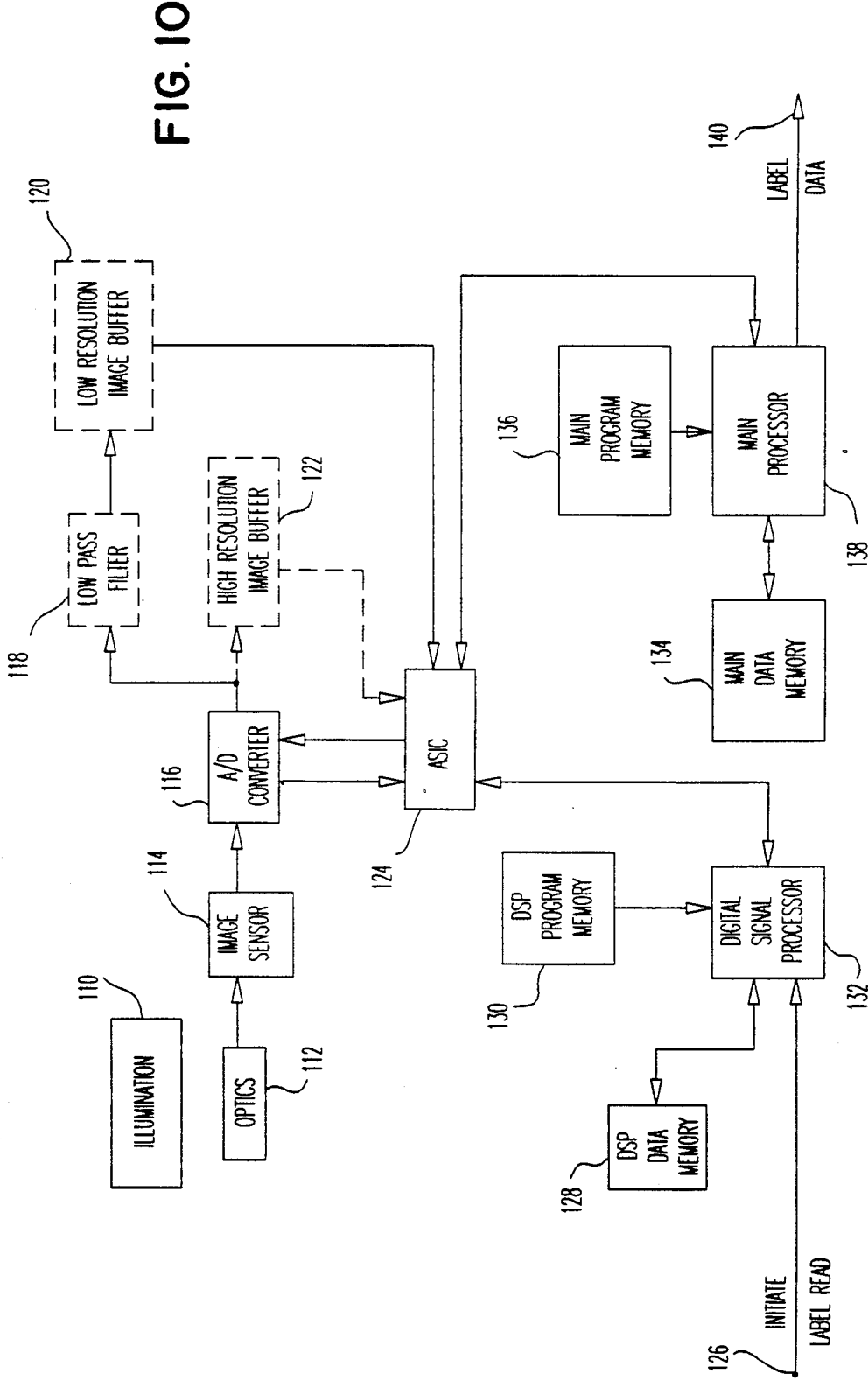
FIG. 10 is a block diagram of a multiple resolution optically encoded label reader in accordance with the present invention.
Figure 11:
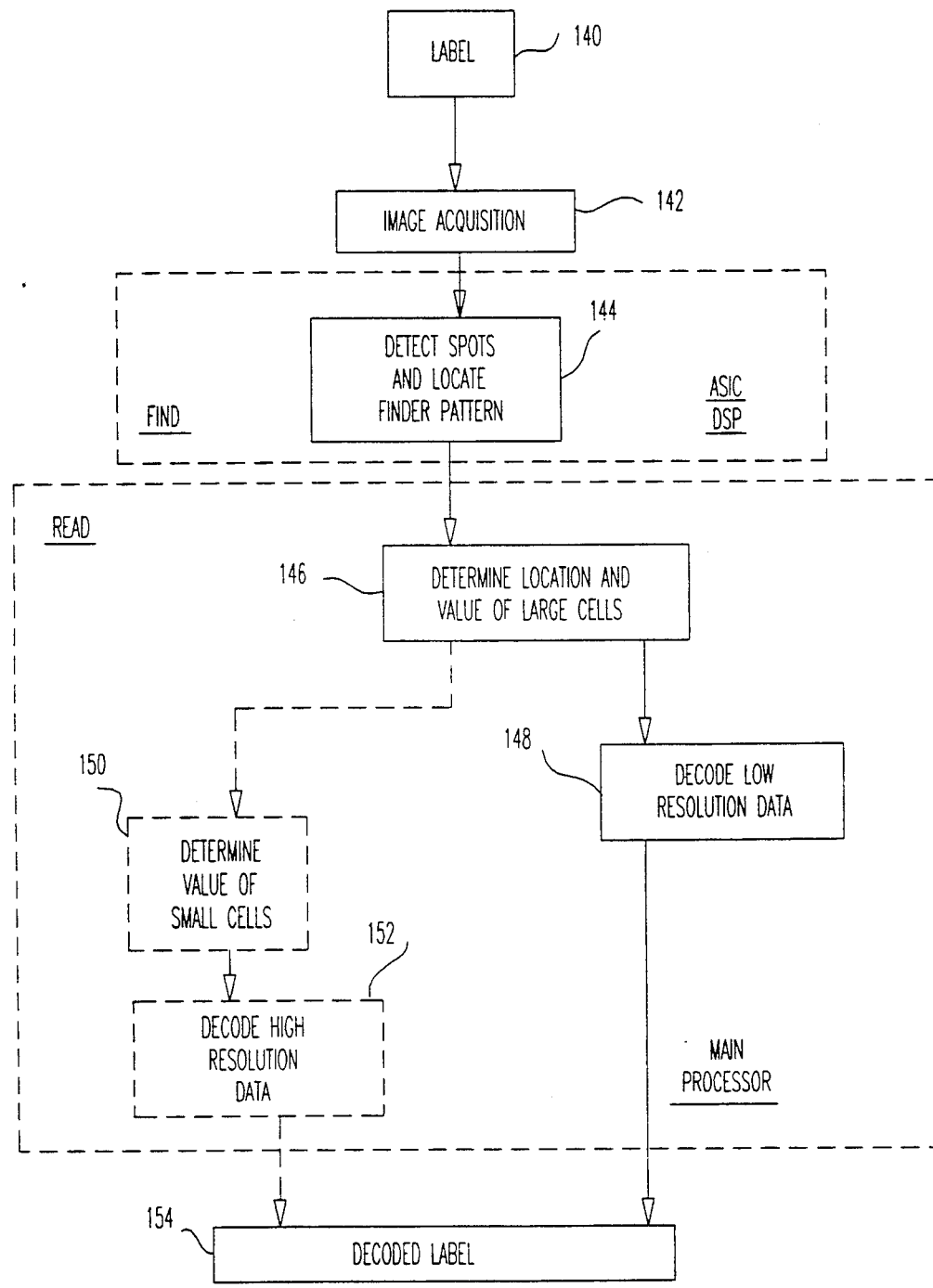
FIG. 11 flow chart representation of the method of finding and reading a multiple resolution optically encoded label in accordance with the present invention.

An apparatus for processing a multiple resolution optically encoded label is shown in FIG. 10. The overall method illustrated in the flow chart of FIG. 11. As shown in FIG. 11, the processing of label 140 to provide a decoded label output 154 is divided into two main processes: a find algorithm, and a read algorithm. An image which may include an optically encoded label is acquired by image acquisition subsystem 142. The spots are detected and the finder pattern is located at step 144. The finding algorithm is carried out by two programmable hardware elements, a digital signal processor (DSP 132 in FIG. 10) and an application specific integrated circuit (ASIC 124 in FIG. 10). A DSP suitable for use in the present invention is the ADSP 2101 available from Analog Devices, Norwood, Mass.

After the label has been located, i.e. found within the image buffer memory, the location and valve of the large cells is determined at step 146, and the low resolution data is then read out and decoded at step 148. If the label also contains high resolution data, then the value of the small cells is determined at step 150. The high resolution data read out and decoded at step 152. The read algorithm is carried out by a separate processor (main processor 138 in FIG. 10). The main processor 138 may be implemented in a high speed microprocessor such as the TMS320C30 available from Texas Instruments, Dallas Tex.

FIG. 10 is a block diagram of a multiple resolution reader system implementing the flow chart of FIG. 11. The image acquisition system comprises an illumination source 110, and suitable optics 112 for forming an image containing the image of a multiple resolution optically encoded label on image sensor 114. Thereafter, analog to digital converter 116 digitizes the acquired image. If only low resolution data is required, then a low resolution image acquisition system is used. In a low resolution reader, the output of the analog to digital converter 116 would go directly to a low resolution image buffer 120. Alternatively, if both high resolution and low resolution data are required, then a high resolution image acquisition system is used. In a high resolution reader, the output of analog to digital converter 116 would be stored in a then required high resolution buffer 122. A low resolution image of the label, to be used for processing purposes, would be created by down sampling or by using a low pass filter 118 to remove image details thereby creating a low resolution image for storage in low resolution image buffer 120. The low resolution image in buffer 120 is used for label finding and for low resolution data decoding.

The image acquisition subsystem is controlled by ASIC 124, which is in turn controlled by digital signal processor (DSP) 132. DSP 132 has an associated DSP program memory 130 and DSP data memory 128. A separate processing element, main processor 138 and its associated main program memory 136 and main data memory 134 is provided for reading the label.

In operation, a signal on terminal 126 to initiate label reading is provided to DSP 132. DSP 132 and ASIC 124 control the image acquisition system and process the acquired image so as to find, or locate, a multiple resolution optically encoded image. The location of the acquired image is transferred to main processor 138, where the acquired image is processed to read and decode the encoded label data for output on terminal 139.

Figure 12:
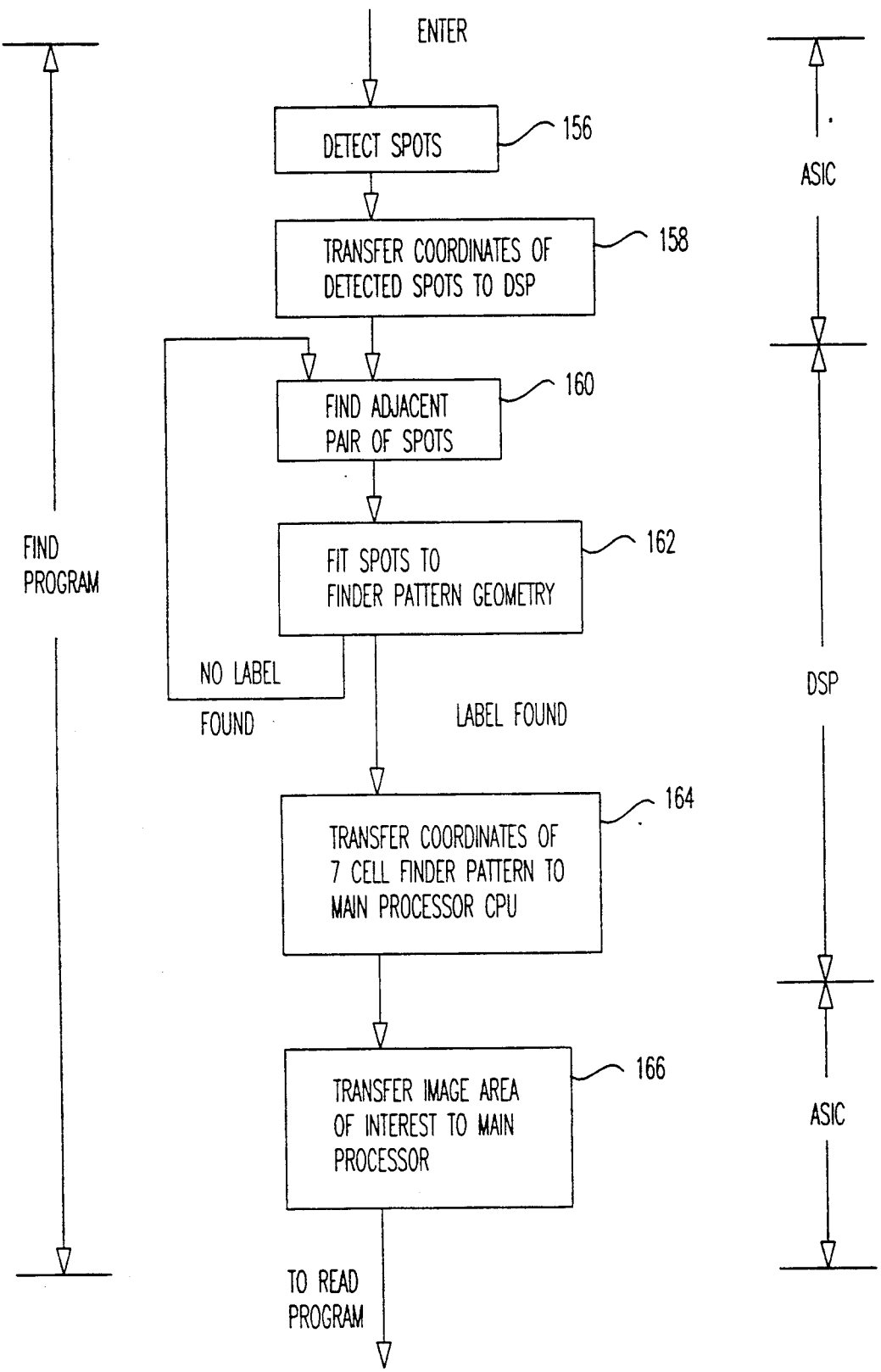
FIGS. 12 and 12a is a flow chart representation of the program for detecting a finder pattern for use in conjunction with the present invention.

FIG. 12 illustrates the algorithm for finding a multiple resolution optically encoded label which is stored somewhere within the field of view of the image acquisition system buffer memory. The find program is carried out by coordination between the ASIC 124 and the DSP 132 (from FIG. 10).

The first step in the finding algorithm of FIG. 12 is to detect spots at step 156, looking for finder spots. Spots, as characteristic formations, are readily detected and are distinguishable from typical background clutter. The spot detector examines each pixel in the low resolution image buffer looking for pixels of one chosen optical value surrounded by pixels of a contrasting optical value (e.g. light spots surrounded by dark spots).

With reference to FIG. 9, the spot detector individually compares the value of a chosen pixel, such as at coordinate position (3,3) with the values of selected surrounding pixels that are approximately one large cell, i.e. one spot diameter D away from the chosen pixel, such as (6,3) which is on a circle of radius D, and (5,1) which is close to but not exactly on a circle of radius D. Thus, the 8 pixel values at the coordinate positions shown in FIG. 9, which are approximately a distance D from the center of finder spot 101 are compared with the pixel value at the center of spot 101. In this embodiment, spots are equals to one large data cell 101.

The spot detector 156 indicates that a spot has been found if 7 of the 8 pixels approximately one cell diameter D away from the center of spot 101 at coordinates (3,3), are of contrasting optical value. Thus, only spots of the correct size (one large cell size) survive the spot detector. Text, bars, constant backgrounds, or anything else of a non-spot nature is not detected The process is repeated over the entire area of the image memory on a pixel-by pixel basis. As the process is carried out, the coordinates of those pixels which pass the spot detector test are transferred to the DSP 132 (FIG. 10) at step 158 in FIG. 12.

Figure 12A:
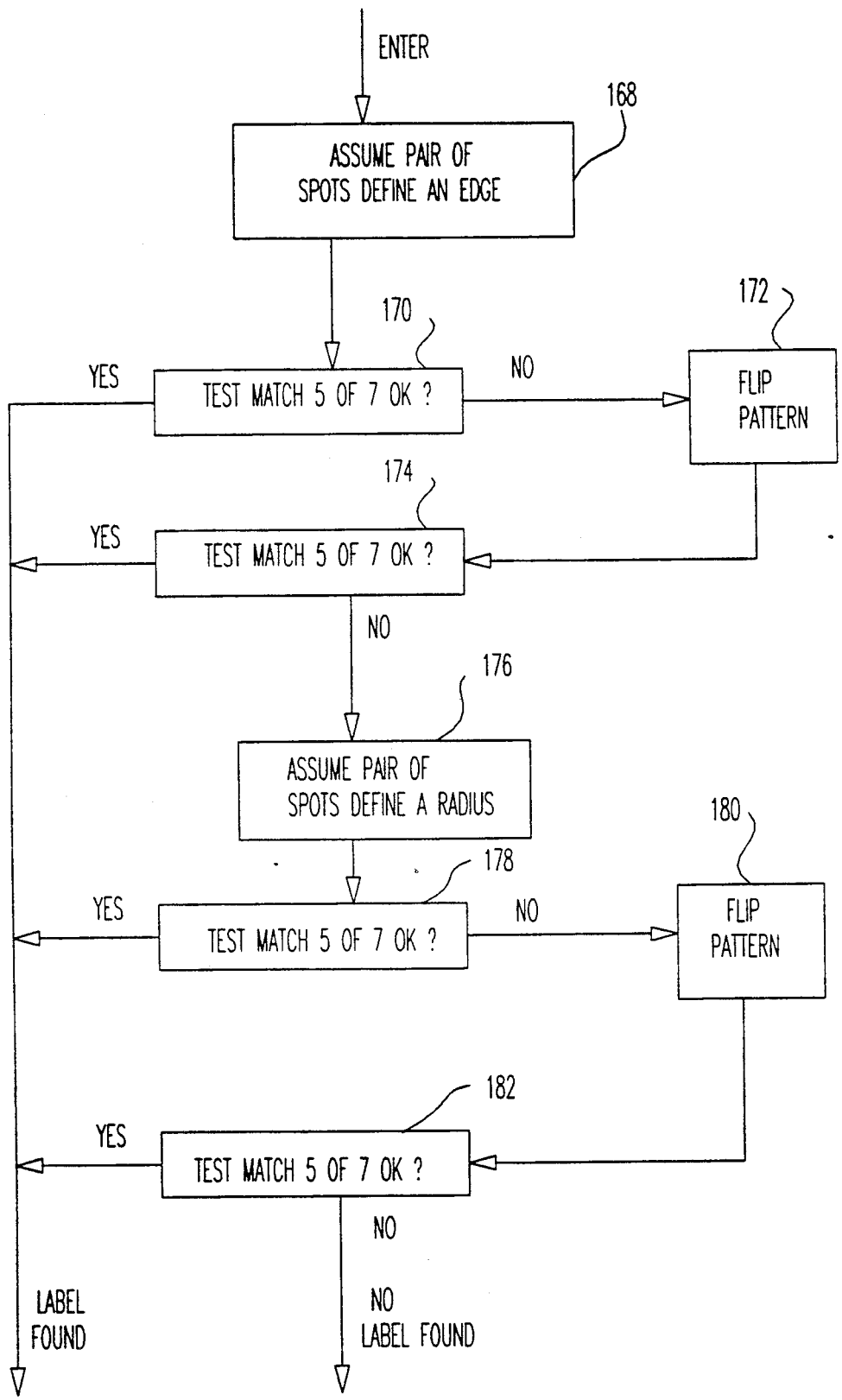

As the DSP accumulates detected spots, each pair of spots is examined in the DSP to find an adjacent pair of spots at step 160. That is, any two spots which are approximately the proper distance apart, i.e. which correspond to the predetermined distance between finder spots, constitute a potential pair of spots at step 160. Thereafter, the DSP will attempt to fit the remaining spots to the known predetermined geometric arrangement of the finder pattern at step 162. Further detail on the steps for fitting detected spots to the finder pattern geometry at step 162 is illustrated in the flow chart program of FIG. 12a.

The fitting algorithm is based on the observation that any pair of spots of the 7 spot finder pattern constitute either an edge or a radius of the finder pattern. The first step is to assume that the two adjacent spots define an edge of a regular hexagon at step 168 in FIG. 12a. Then, at step 170 all the other surrounding spots which had been detected by the spot detector will be compared to the known geometric arrangement of the finder pattern, i.e. a test pattern. If the test match indicates that there is a match, i.e. 5 out 7 potential finder spot locations match actual detected finder spots, at step 170, then the program exits indicating that a label has been found.

If the test match does not indicate a match at step 170, then the test pattern used for comparison at step 172 is flipped. Flipping the test pattern corresponds to an assumption that the assumed pair of detected spots do define an edge, but that the remainder of the finder spots fall opposite the assumed test pattern as a mirror image. In the latter case, only 2 out of 7 detected spots, i.e. the adjacent pair of spots, will match the test pattern. Flipping the test pattern at step 172 and again testing whether or not 5 of the 7 spots match the test pattern at step 174 will resolve the ambiguity. If 5 of the 7 spots match the flipped test pattern at step 174, then a label is considered found.

If, on the other hand, 5 out of 7 of the spots did not match the test pattern, then an assumption is made that the pair of spots define a radius at step 176. The actual spots detected are again tested to match 5 out of 7 spots to the known geometric arrangement of the finder pattern at step 178. If 5 out of 7 of the spots match, then the label is considered found. However, if the test fails, then the test pattern is flipped at step 180 and again tested for a match at step 182. Flipping the test pattern corresponds to an assumption that the assumed pair of detected spots do define a radius, but that the assumed test pattern of the finder spots is a mirror image of the actual finder pattern. In the latter case, only 4 out of 7 detected spots will match the test pattern. Flipping the test pattern at step 180 and again testing whether or not 5 of the 7 spots match a predetermined test pattern at step 182 will resolve the ambiguity. If 5 out of 7 match at step 182, the label is considered found. However, if all test matches 170, 174, 178, 182 fail, then no label is considered found.

Returning to the flow chart of FIG. 12, if no label is considered found at step 162, then the program is reentered at step 160 to find a different pair of adjacent spots. The process is carried out continuously as the coordinates of additional detected spots are transferred to the DSP at step 158.

Eventually, when a label is found, the coordinates of the 7 cell finder pattern are transferred to the main processor at step 164. The ASIC 124 (FIG. 10) is then commanded to transfer the image area of interest surrounding the 7 cell finder pattern to the main processor at step 166, and the read program, stored in the main processor program memory, is entered. The foregoing method of finding allows rapid and reliable finding of a target and label, even when a large amount of area must be processed.

Figure 7A:
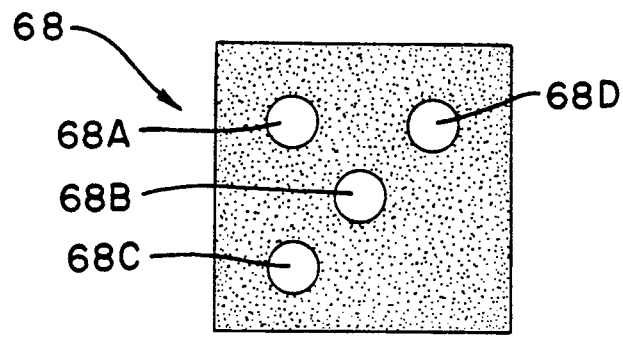
FIGS. 7a, 7b, and 7c illustrate alternate forms of finder patterns which may be used in conjunction with the present invention.
Figure 7B:
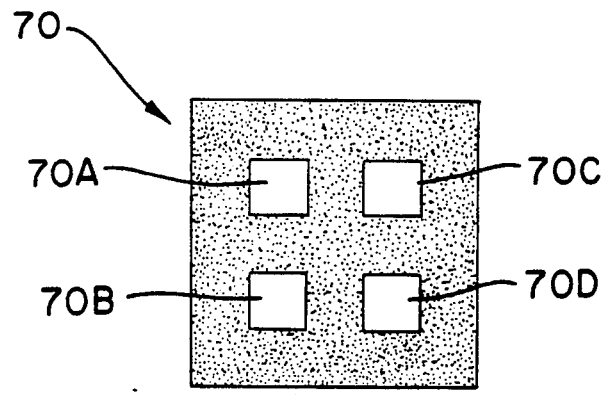
Figure 7C:
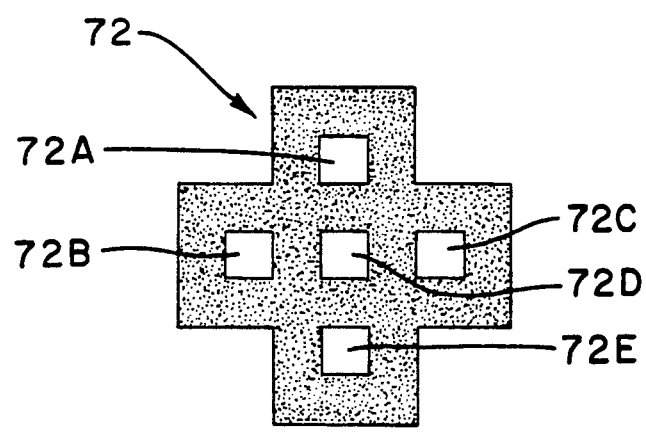

Other types of finder patterns consisting of an array of spots in a predetermined geometric pattern may be used. FIGS. 7a, 7b, and 7c illustrate a variety of alternative finder patterns. Specifically, in FIG. 7a an asymmetrical finder pattern 68 consisting of 4 circular spots 68a through 68d is illustrated. A finder pattern 70 consisting of 4 square spots 70a through 70d arranged in a square geometric pattern is shown in FIG. 7b. Yet another alternative embodiment of a finder pattern is shown is shown in FIG. 7c wherein finder pattern 72 consists of 4 square spots 70a through 70e arranged in a symmetrical cross pattern. The finder pattern can be asymmetrical, or symmetrical about a single axis as in FIG. 7a, which also provides non-ambiguous orientation information regarding the found label. The geometric arrangement of the finder pattern need only be predetermined so that detected spots can be matched to the predetermined pattern, and that the location of any one spot of the finder pattern can be determined by geometry from some or all of the other spots of the finder pattern. The geometric pattern of the finder spots can be regular, symmetrical, asymmetrical, or pseudorandom.

Once the label has been found, the main processor 138 in FIG. 10 reads the label as follows:
1) Construct a 19 point large cell center sampling pattern for sampling large cell centers.
2) Determine the location of the large cell centers using the maximum standard deviation of the 19 point large cell center sampling pattern.
3) Decode large cell information.
4) Determine the position of the small cells within the large cells from the known location of the large cell centers.
5) Decode the small cell information.

When both high resolution and low resolution data is present, the reader would first process the low resolution data to find the coordinates of the centers of the large data cells. Once the centers and the optical values of the large data cells are determined, the high resolution data cells may be located relative to the low resolution data cells and then directly read out. The process for reading the large cell low resolution data is the same whether small cell high resolution data is present or not.

Figure 13A:
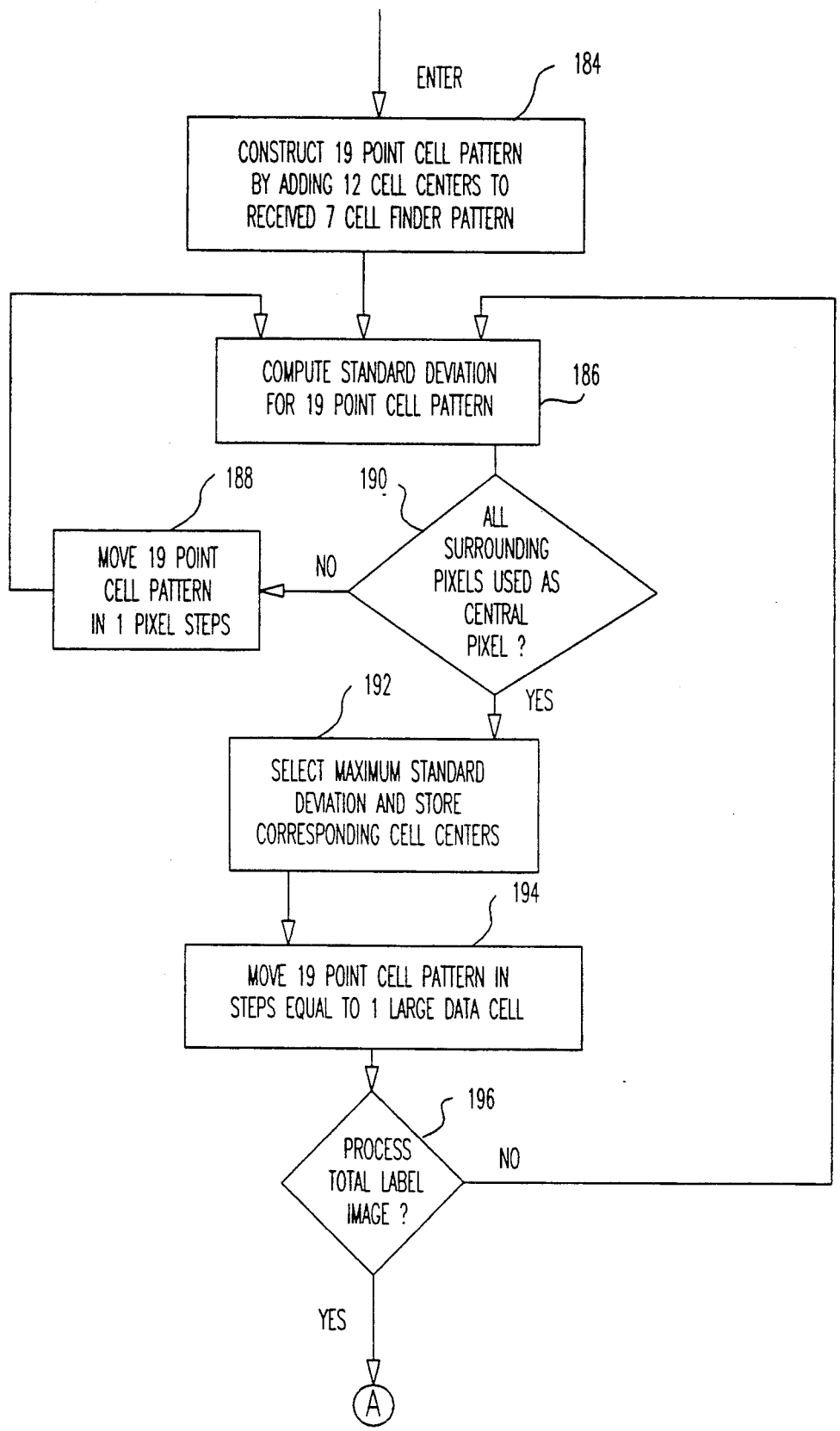
FIGS. 13a and 13b flow chart illustrating the program for reading both high resolution data and low resolution data encoded on a multiple resolution optically encoded label in accordance with the present invention.
Figure 13B:
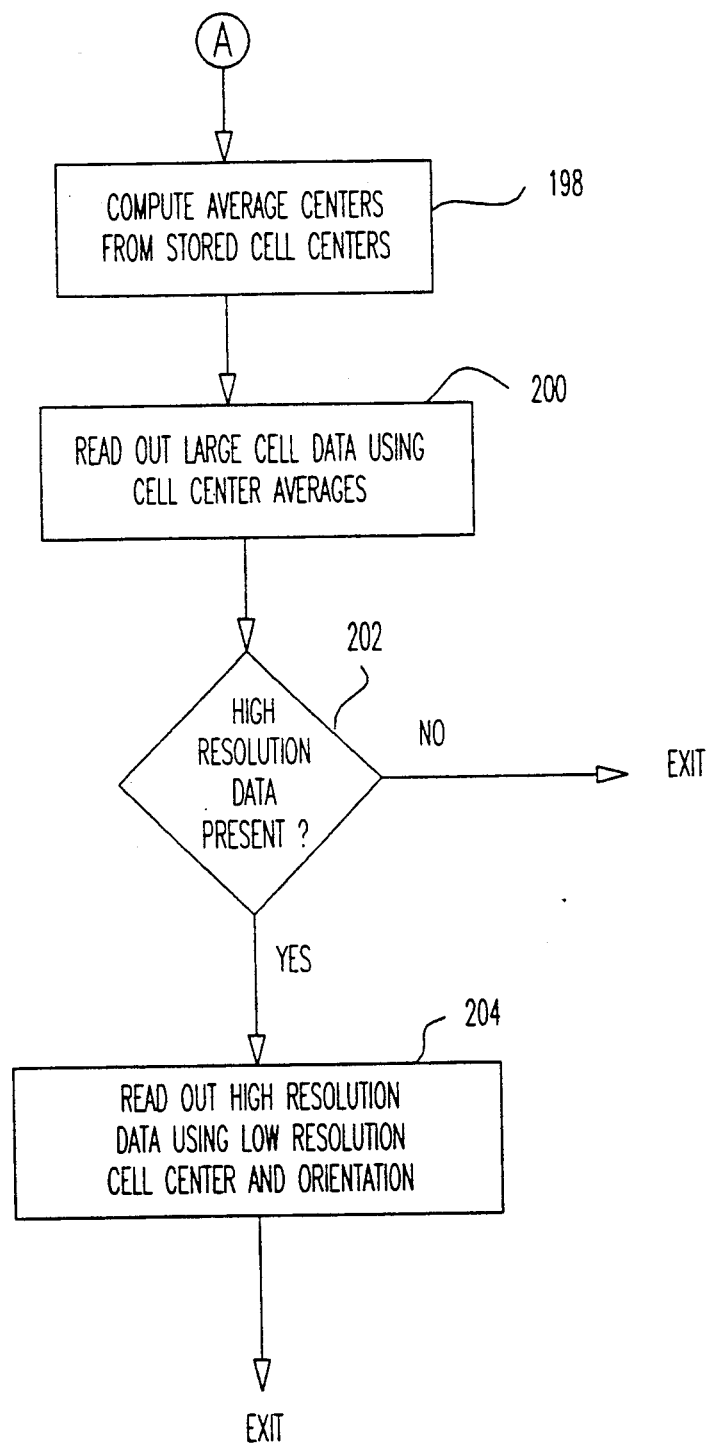
Figure 14A:
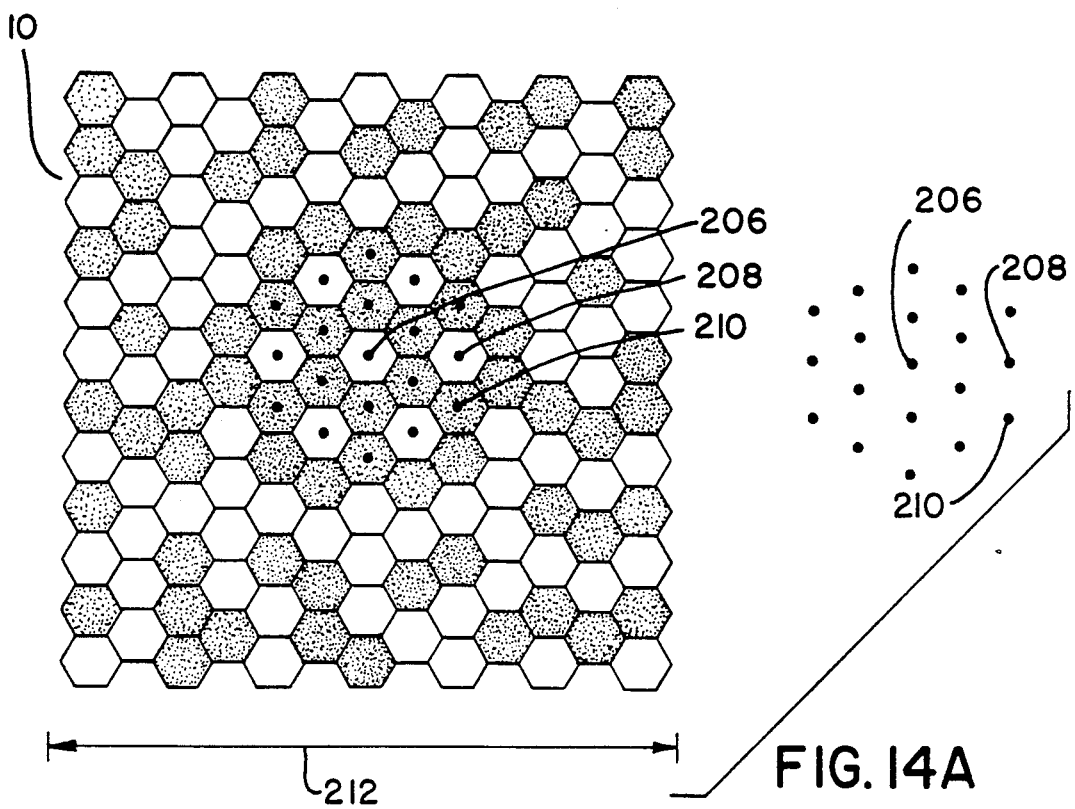
FIGS. 14a and 14b illustrate the process for reading low resolution data cells of a multiple resolution optically encoded label in accordance with the present invention.

The read program which is carried out by the main processor is illustrated in the flow charge of FIGS. 13a and 13b. The first step in reading hte label is to construct a 19 point large cell center sampling pattern based on the known geometry of the array of large cells contained in a label as shown in FIG. 14a. The 19 point large cell center sampling pattern is comprised of a series of coordinates that are relative to and surrounding any arbitrary central pixel 206. The geometry of the 19 point large cell center sampling pattern is constructed such that if the central pixel 206 is the center of a large cell, each of the other points 208, 210 in the 19 point large cell center sampling pattern will also be in the center of the large cells surrounding the central pixel 206 of the central large cell.

In order ton construct the 19 point large cell center sampling pattern, the accurate location of the 7 finder spots are first determined. Accurate locations (e.g. central pixels) of the finder pattern spots are determined by searching the area in the immediate vicinity of each spot identified by the spot detector for a pixel grouping of maximum value. If the number of spots identified by the finder is less than the expected number of spots, accurate locations of the identified spots are first determined, then using the known expected geometry of the finder and label, the locations of the missing finder spots are computed.

Starting from the actual geometry of the detected and/or computed 7 finder spots, and the expected geometry of the label, 12 additional large cell center coordinates are computed. The constructed 19 point large cell center sampling pattern is shown in FIG. 14a superimposed on the data array as well as shown separate from the data array for clarity.

The 19 point large cell center sampling pattern is used to locate the center of each large cell by choosing a center pixel, and then taking the standard deviation of the center pixel and all of the surrounding pixels determined by the sampling pattern. If the sampling pattern is centered on the cells, the standard deviation will be high. As the sampling pattern is moved away from cell centers, the standard deviation becomes low.

The standard deviation is a statistical measure of the differences among a set of values. The standard deviation computation is well known in the field of mathematics. Briefly, if all numbers in a set are approximately equal to each other, the standard deviation is very low. If half the numbers in a set are at some minimum and the other half are at some maximum, the standard deviation will tend to be highest.

The standard deviation for the 19 point cell center sampling pattern will be maximum when it is positioned near the center of the large data cells, because at least some of the 19 data cells covered will be of one optical value, while others will be of the opposite optical value. Conversely, the standard deviation for the 19 point cell center sampling pattern will be minimum when it is positioned near the edges of the large data cells, where optical values tend to be grey in the transition areas between large data cells.

In operation, the central pixel 206 of the central finder spot or large cell, is used as the starting point of the determination of the locations of all the large cell centers. The sampling pattern is overlaid at this position, and the standard deviation of all pixels of the sampling pattern is computed at step 186. Additional sampling pattern standard deviations are computed using the sampling pattern where each of the pixels surrounding the original central pixel are used as the central pixel in step 188 until all surrounding pixels are used as the central pixel of the 19 point cell center sampling pattern at step 190. The goal is to maximize the standard deviation of the sampling pattern within a small neighborhood of pixels. When the standard deviation is maximized, the coordinates of all points in the sampling pattern at the maximized location are recorded (these are expected centers of large cells). One standard deviation maximization provides a list of coordinates for possible large cell centers for all of the 19 points in the large cell center sampling pattern. Thus, the 19 point cell center pattern position having the maximum standard deviation will be selected as the true centers of the 19 data cells at step 192. The 19 corresponding cell centers are stored in memory at step 192.

The process is then repeated for the entire label, each time starting with an unsearched central cell location adjacent to the cell where the standard deviation was greatest.

In each new position, the steps of maximizing the standard deviation at steps 186 and 188 is repeated. The result will yield another set of 19 cell centers based on the new computed maximum standard deviation. The process is repeated for each large data cell until the entire label image area has been processed at step 196. The net result of this process is a large quantity of coordinate values for the large cell centers. The final step in determining the cell centers is to take the average of coordinates recorded for each cell at step 198. These are the best cell coordinate estimates.

Before reading the data stored in the large cells, a histogram of all grey values at the cell center coordinates is taken in order to determine a threshold level between light and dark cells. The value of each large cell is then determined by comparing it to the computed threshold value. Once the centers of the large cells are known and the optical threshold level is determined, it is a relatively simple matter to read out the pixel values using the computed cell center averages at step 200.

If no high resolution data is present, the program exits at this point. If however high resolution data is present, then the high resolution data is read out at step 204. Since the center of the low resolution large cell has been accurately determined, position of the high resolution cells can be determined relative to the computed center and read out directly. This method of dead reckoning from the computed large cell center to find the small cell centers is practical because of the small distances between the center of the large cell and any of the small high resolution cells.

It is noted that the finder pattern will determine the orientation of the label along one of six potential axis. The ambiguity is resolved by reading out the data in all six directions. The encoding will only permit a successful attempted in all six directions until a successful decode is achieved.

In the preferred embodiment there are 150 large cells. The finder target requires 31 cells, leaving 119 large cells (or bits) for low resolution encoding of high priority data. Ultimately, the encoding capability of the 119 low resolution data cells is approximately 5 to 20 characters, depending the type of error correction used and the number of bits per character. In general, since the image acquisition system performs better with larger optical features, i.e. large cell sizes, less error correction is required.

High resolution information is encoded on top of the 119 low resolution information large cells, and also on the 24 large dark cells surrounding the 7 light finder target spots. The actual finder target spots are not used for high resolution information due to the critical nature of the finder spots in the label finding process. Therefore, the total large cells available for high resolution encoding is 119 plus 24 or 143 total. At 4.39 bits per large cell, the high resolution cells provide an additional 627 bits available for data encoding. For simplified encoding, each large cell may encode 4 high resolution data bits. Thus, depending on the type of error correction, and the number of bits per character, the high resolution portion of the label can provide between 30 to 150 additional characters of information.

Thus, the label contain 119 bits of low resolution information plus 627 bits of high resolution information for a total of 746 bits. The total number of bits in the label, and the allocated portion of the total bits to high priority (low resolution) versus low priority data (high resolution) data can be increased or decreased by varying the overall size of the label and/or varying the ratio of the large cell size to the small cell size.

In general, it is desirable to apply error correction to both the low and high resolution encoding and decoding process to insure a very high degree of data integrity upon decoding the message. Conventional error correcting techniques familiar to those skilled in the art may be used in the encoding and decoding processes.

The high resolution decode begins at the center of each large cell and determines the location of the small cells contained within the large cells. Once the locations of the small cells within the large cells are determined, the encoded data can be recovered in a procedure that is the inverse of the encoding procedure.

Figure 14B:
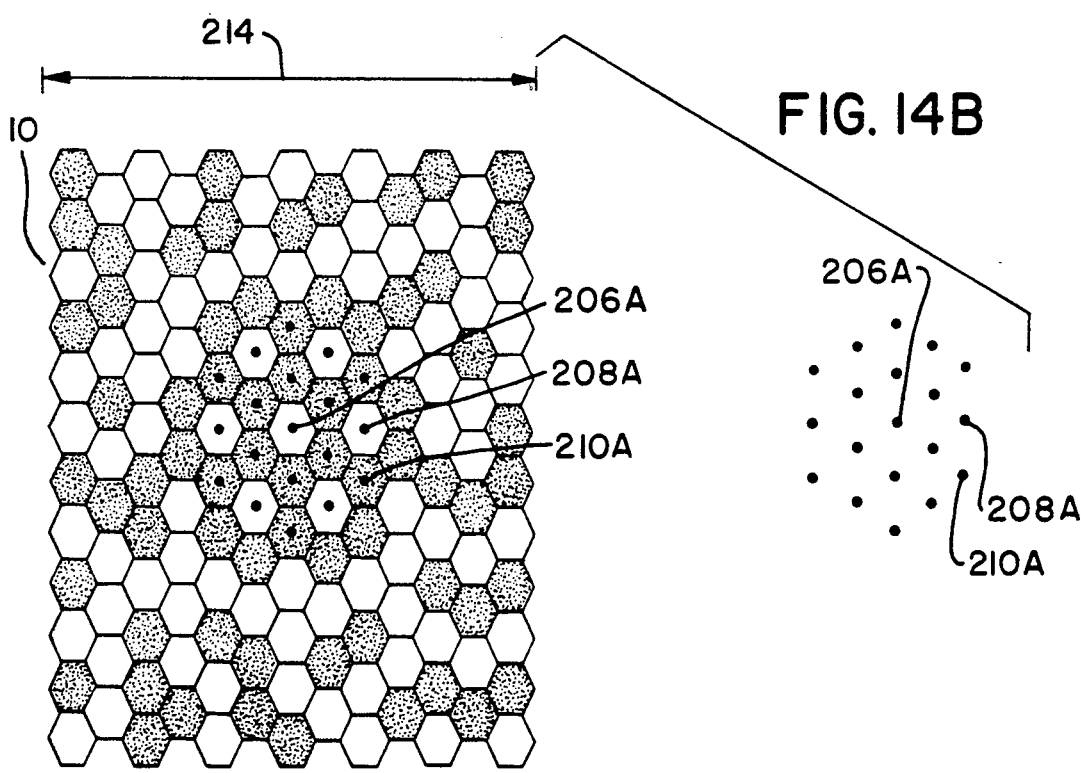

FIG. 14b illustrates the effect of a tilted label and how the present system compensates for the resulting distortion. Since the label in FIG. 14b is tilted, width 214 will be less than the width 212 in FIG. 14a. However, since the geometric arrangement of the finder pattern is analogous to the geometric arrangement of the data array, then the geometric pattern of the 7 cell finder pattern will contain the same distortions along the same axis as the label 10. Consequently in FIG. 14b, distance between cell centers 206a and 208a will be less than the distance between cell centers 206 and 208 in FIG. 14a. However, since the distortion in this example is only along one axis, the distance between cell center 208a and cell center 210a in FIG. 14b will be the same as the distance between cell center 208 and cell center 210 in FIG. 14a.

In general, the detected 7 cell finder pattern will reflect any distortions found in the label. Furthermore, any distortions in the detected 7 cell finder pattern will be incorporated into the constructed 19 point large cell center sampling pattern, including any distortions due to magnification and tilt. Since the 19 point large cell center sampling pattern shown in the right-hand portion of FIG. 14b contains the same distortions as found in label, the locations of the cells in the label will still be accurately found. Finally, averaging the large number of data points collected for each of the large data cell locations using the 19 point large cell center sampling pattern, tends to produce an accurate value of the true center location of each of the large data cells.

Most of the advantages of low resolution encoding and decoding are realized in the image acquisition system. The depth of field increases, permitting the use of fixed focus optics having reduced tolerances, and the required illumination power is reduced. The required size of the image buffer memory is reduced, and the data processing requirements are reduced as a result of having less data at a slower rate to process. For example, low resolution information may be sampled at 32 pixels per inch at 4 bits per pixel. A large cell which has a diameter of 3 pixels results in 2 to 3 samples per cell. The diameter of the high resolution cells is approximately ⅓ the diameter of the low resolution cells. Therefore the optics and imager in a high resolution system must resolve features 3 times smaller than a low resolution system. Therefore it may be necessary to use a lens with variable focus and/or zoom, a distance measuring device to measure the label distance in order to set the focus and/or zoom prior to capturing the image. The image must be of higher resolution. Finally, the high resolution image buffer must be at least 9 times the size of the low resolution image buffer since the sampling factor is increased by a factor of 3 in both directions.

The label, process and system of the present invention takes advantage of the low resolution large cell features, while encoding high resolution data at a very high density. If only low resolution data is necessary, the overall optical reader system is much less complex than a high and low resolution system. Only when high resolution data is necessary, will the additional complexity of a high resolution optical reader system be required.

What is claimed is:

1. A system arrangement using a multiple resolution optically encoded label having a first plurality of low resolution information encoded data cells, and a second plurality of high resolution information encoded data cells at least partially superimposed with said first plurality of low resolution information encoded data cells and encoding information independent of said first plurality of low resolution information encoded data cells, wherein each of said second plurality of high resolution information encoded data cells is smaller than each of said first plurality of low resolution information encoded data cells, said system comprising:

a first plurality low resolution readers for decoding said optically encoded multiple resolution label to read said low resolution first information encoded data cells; and a second plurality of high resolution readers for decoding said optically encoded multiple resolution label to read said low resolution first information encoded data cells and said high resolution second information encoded data cells.

2. In a system arrangement using a multiple resolution optically encoded label having a first plurality of low resolution information encoded data cells, and a second plurality of high resolution information encoded data cells at least partially superimposed with said first plurality of low resolution information encoded data cells and encoding information independent of said first plurality of low resolution information encoded data cells, wherein each of said second plurality of high resolution information encoded data cells is smaller than each of said first plurality of low resolution information encoded data cells, a method comprising:

decoding said optically encoded multiple resolution label to read said low resolution first information encoded data cells at a first location in said system; and decoding said optically encoded multiple resolution label to read said high resolution second information encoded data cells at a second location in said system.

3. An item sorting system comprising:

a multiple resolution optically encoded label on said item, said multiple resolution optically encoded label having a first plurality of low resolution information encoded data cells, and a second plurality of high resolution information encoded data cells at least partially superimposed with said first plurality of low resolution information encoded data cells and encoding information independent of said first plurality of low resolution information encoded data cells, wherein each of said second plurality of high resolution information encoded data cells is smaller than each of said first plurality of low resolution information encoded data cells, said low resolution first information encoded data cells encoding sorting information for said item, and said high resolution second information encoded data cells encoding other identifying information for said item; means for decoding said multiple resolution optically encoded label to read said low resolution sorting information from said first information encoded data cells at a first location in said item sorting system; and means for sorting said item responsive to said decoded sorting information.

4. An item sorting system in accordance with claim 3, wherein said low resolution first information encoded data cells encoding sorting information for said item encode zip code information representing the destination for said item.

5. A method for use in an item sorting system, said method comprising:

optically encoding a label having a first plurality of low resolution information encoded data cells, and a second plurality of high resolution information encoded data cells at least partially superimposed with said first plurality of low resolution information encoded data cells and encoding information independent of said first plurality of low resolution information encoded data cells, wherein each of said second plurality of high resolution information encoded data cells is smaller than each of said first plurality of low resolution information encoded data cells, said low resolution first information encoded data cells encoding sorting information for said item, and high resolution second information encoded data cells encoding other identifying information for said item;

decoding said multiple resolution optically encoded label to read said low resolution sorting information from said first information encoded data cells at a first location in said item sorting system; and sorting said item responsive to said decoded sorting information.

6. A method for use in an item sorting system in accordance with claim 5, wherein said low resolution first information encoded data cells encoding sorting information for said item encode zip code information representing the destination for said item.

7. In a reader for reading an optically encoded multiple resolution label having a first plurality of low resolution information encoded data cells, and a second plurality of high resolution information encoded data cells at least partially superimposed with said first plurality of low resolution information encoded data cells and encoding information independent of said first plurality of low resolution information encoded data cells, wherein each of said second plurality of high resolution information encoded data cells is smaller than each of said first plurality of low resolution information encoded data cells, a method for reading said optically encoded multiple resolution label, said method comprising:

- capturing a two dimensional image for storage in a memory, said stored two dimensional image containing an image of said optical encoded multiple resolution label anywhere within the field of view of said stored two dimensional image;
- detecting the location of said optically encoded multiple resolution label within said stored two dimensional image;
- decoding said low resolution information encoded data cells; and
- decoding said second plurality of high resolution information encoded data cells.

8. A method in accordance with claim 7, wherein said high resolution information encoded data cells of said optically encoded multiple resolution label are disposed in predetermined relation to said low resolution information encoded data cells, and wherein said step of decoding said high resolution information encoded data cells further comprises:

- locating said low resolution information encoded data cells; and
- locating said high resolution information encoded data cells at said predetermined relation to said located low resolution information encoded data cells.

9. A method in accordance with claim 8, wherein said multiple resolution optically encoded label includes a finder pattern having a plurality of spots arranged in a predetermined geometric pattern, said low resolution information encoded data cells being arranged in a two dimensional array having a predetermined geometric pattern similar to said predetermined geometric pattern of said plurality of spots of said finder pattern, said step of locating said low resolution information encoded data cells further comprises:

- detecting said spots of said finder pattern; and
- detecting said low resolution information encoded data cells using the detected geometric pattern of said detected finder spots.

10. In a reader in accordance with claim 7, wherein each of said high resolution information encoded data cells is disposed within one of said low resolution information encoded data cells, and wherein the position of said high resolution information encoded data cell within said low resolution information encoded data cell represents the data encoded by said high resolution information encoded data cell, said method of decoding said high resolution information encoded data cell further comprises:

- providing a first signal indication for a first position of said high resolution information encoded data cell within said low resolution information encoded data cell; and
- providing a second signal indication for a second position of said high resolution information encoded data cell within said low resolution information encoded data cell.

11. A reader in accordance with claim 7, further including a plurality of said high resolution information encoded data cells, wherein at least one of said plurality of second plurality of high resolution information encoded data cells is disposed within said low resolution information encoded data cell, and wherein the number of said high resolution information encoded data cells within said low resolution information encoded data cell represents the data encoded by each of said plurality of second plurality of high resolution information encoded data cells, said method of decoding said high resolution information encoded data cells further comprises:

- providing a first signal indication for a first number of said high resolution information encoded data cells within said low resolution information encoded data cell; and
- providing a second signal indication for a second of number of said high resolution information encoded data cells within said low resolution information encoded data cell.

12. A reader in accordance with claim 7, wherein the shape of said high resolution information encoded data cell represents the data encoded by said high resolution information encoded data cell, said method of decoding said high resolution information encoded data cells further comprises:

- providing a first signal indication for a first shape of said high resolution information encoded data cell within said low resolution information encoded data cell; and
- providing a second signal indication for a second shape of said high resolution information encoded data cell within said low resolution information encoded data cell.

13. A reader in accordance with claim 7, wherein the orientation of said high resolution information encoded data cell represents the data encoded by said high resolution information encoded data cell, said method of decoding said high resolution information encoded data cells further comprises:

- providing a first signal indication for a first orientation of said high resolution information encoded data cell within said low resolution information encoded data cell; and
- providing a second signal indication for a second orientation of said high resolution information encoded data cell within said low resolution information encoded data cell.

14. A reader in accordance with claim 7, wherein the reflective optical property of said high resolution information encoded data cell represents the data encoded by said high resolution information encoded data cell, said method of decoding said high resolution information encoded data cells further comprises:

- providing a first signal indication for a first reflective property of said high resolution information encoded data cell within said low resolution information encoded data cell; and
- providing a second signal indication for a second reflective property of said high resolution information encoded data cell within said low resolution information encoded data cell.

15. A reader in accordance with claim 7, wherein the size of said high resolution information encoded data cell represents the data encoded by said high resolution information encoded data cell, said method of decoding said high resolution information encoded data cells further comprises:

providing a first signal indication for a first siad high resolution information encoded data cell within said low resolution information encoded data cell; and providing a second signal indication for a second size of said high resolution information encoded data cell within said low resolution information encoded data cell.

16. In a reader for reading an optically encoded multiple resolution label having a first plurality of low resolution information encoded data cells, and a second plurality of high resolution information encoded data cells at least partially superimposed with said first plurality of low resolution information encoded data cells and encoding information independent of said first plurality of low resolution information encoded data cells, wherein each of said second plurality of high resolution information encoded data cells is smaller than each of said first plurality of low resolution information encoded data cells, an apparatus for reading said optically encoded multiple resolution label, said apparatus comprising:

means for capturing a two dimensional image for storage in a memory, said stored two dimensional image containing an image of said optical encoded multiple resolution label anywhere within the field of view of said stored two dimensional image;

means for detecting the location of said optically encoded multiple resolution label within said stored two dimensional image;

means for decoding said low resolution information encoded data cells; and means for decoding said high resolution information encoded data cells.

17. An apparatus in accordance with claim 16, wherein said high resolution information encoded data cells of said optically encoded multiple resolution label are disposed in predetermined relation to said low resolution information encoded data cells, and wherein said means for decoding said high resolution information encoded data cells further comprises:

means for locating said low resolution information encoded data cells; and means for locating said high resolution information encoded data cells at said predetermined relation to said located low resolution information encoded data cells.

18. An apparatus in accordance with claim 17, wherein said multiple resolution optically encoded label includes a finder pattern having a plurality of spots arranged in a predetermined geometric pattern, said low resolution information encoded data cells being arranged in a two dimensional array having a predetermined geometric pattern similar to said predetermined geometric pattern of said plurality of spots of said finder pattern, said means for locating said low resolution information encoded data cells further comprises:

means for detecting said spots of said finder pattern; and means for detecting said low resolution information encoded data cells using the detected geometric pattern of said detected finder spots.

19. In a reader in accordance with claim 16, wherein each of said high resolution information encoded data cells is disposed within one of said low resolution information encoded data cells, and wherein the position of said high resolution information encoded data cell within said low resolution information encoded data cell represents the data encoded by said high resolution information encoded data cell, said means for decoding said high resolution information encoded data cell further comprises:

means for providing a first signal indication for first position of said high resolution information encoded data cell within said low resolution information encoded data cell; and means for providing a second signal indication for a second position of said high resolution information encoded data cell within said low resolution information encoded data cell.

20. A reader in accordance with claim 16, further including a plurality of said high resolution information encoded data cells, wherein at least one of said second plurality of high information encoded data cells is disposed within said low resolution information encoded data cell, and wherein the number of said high resolution information encoded data cells within said low resolution information encoded data cell represents the data encoded by each of said second plurality of high information encoded data cells, said means for decoding said high resolution information encoded data cells further comprises:

means for providing a first signal indication for a first number of said high resolution information encoded data cells within said low resolution information encoded data cell; and means for providing a second signal indication for a second of number of said high resolution information encoded data cells within said low resolution information encoded data cell.

21. A reader in accordance with claim 16, wherein the shape of said high resolution information encoded data cell represents the data encoded by said high resolution information encoded data cell, said means for decoding said high resolution information encoded data cells further comprises:

means for providing a first signal indication for a first shape of said high resolution information encoded data cell within said low resolution information encoded data cell; and means for providing a second signal indication for a second shape of said high resolution information encoded data cell within said low resolution information encoded data cell.

22. A reader in accordance with claim 16, wherein the orientation of said high resolution information encoded data cell represents the data encoded by said high resolution information encoded data cell, said means for decoding said high resolution information encoded data cells further comprises:

means for providing a first signal indication for a first orientation of said high resolution information encoded data cell within said low resolution information encoded data cell; and means for providing a second signal indication for a second orientation of said high resolution information encoded data cell within said low resolution information encoded data cell.

23. A reader in accordance with claim 16, wherein the reflective optical property of said high resolution information encoded data cell represents the data encoded by said high resolution information encoded data cell, said means for decoding said high resolution information encoded data cells further comprises:

means for providing a first signal indication for a first reflective property of said high resolution information encoded data cell within said low resolution information encoded data cell; and 'means for providing a second signal indication for a second reflective property of said high resolution information encoded data cell within said low resolution information encoded data cell.

24. A reader in accordance with claim 16, wherein the size of said high resolution information encoded data cell represents the data encoded by said high resolution information encoded data cell, said means for decoding said high resolution information encoded data cells further comprises:

means for providing a first signal indication for a first size of said high resolution information encoded data cell within said low resolution information encoded data cell; and means for providing a second signal indication for a second size of said high resolution information encoded data cell within said low resolution information encoded data cell.

25. In a label printer for optically encoding a multiple resolution label encoding message information comprising a first plurality of message information data bits, a method comprising:

encoding a first plurality of low resolution information encoded data cells on said label, the optical property of each of said first plurality of low resolution information encoded data cells being determined by said data bits of said message information; and encoding a second plurality of high resolution information encoded data cells on said label, at least partially superimposed with said first plurality of low resolution information encoded data cells, and encoding information independent of said first plurality of low resolution information encoded data cells, wherein each of said second plurality of high resolution information encoded data cells is smaller than each of said first plurality of low resolution information encoded data cells.

26. A label printer in accordance with claim 25, for printing an optically encoded label wherein the position of said high resolution encoded data cells in relation to said low resolution encoded data cells represents the data encoded by said high resolution encoded data cells.

27. A label printer in accordance with claim 25, for printing an optically encoded label wherein the number of said high resolution encoded data cells within said low resolution encoded data cells represents the data encoded by said second plurality of information encoded data cells.

28. A label printer in accordance with claim 25, for printing an optically encoded label wherein the shape of said high resolution encoded data cells represents the data encoded by said high resolution encoded data cells.

29. A label printer in accordance with claim 25, for printing an optically encoded label 1, wherein the orientation of said high resolution encoded data cells represents the data encoded by said high resolution encoded data cells.

30. A label printer in accordance with claim 25, for printing an optically encoded label wherein the reflective optical property of said high resolution encoded data cells represents the data encoded by said high resolution encoded data cells.

31. A label printer in accordance with claim 25, for printing an optically encoded label wherein the size of said high resolution encoded data cells represents the data encoded by said high resolution encoded data cells.

32. A label printer for optically encoding a multiple resolution label encoding message information comprising a first plurality of message information data bits, said label printer comprising:

means for encoding a first plurality of low resolution information encoded data cells on said label, the optical property of each of said first plurality of low resolution information encoded data cells being determined by said data bits of said message information; and means for encoding a second plurality of high resolution information encoded data cells on said label, at least partially superimposed with said first plurality of low resolution information encoded data cells, and encoding information independent of said first plurality of low resolution information encoded data cells, wherein each of said second plurality of high resolution information encoded data cells is smaller than each of said firs plurality of low resolution information encoded data cells.

33. A label printer in accordance with claim 32, for printing an optically encoded label wherein the position of said high resolution encoded data cells in relation to said low resolution encoded data cells represents the data encoded by said high resolution encoded data cells.

34. A label printer in accordance with claim 32, for printing an optically encoded label wherein the number of said high resolution encoded data cells within said low resolution encoded data cells represents the data encoded by said second plurality of information encoded data cells.

35. A label printer in accordance with claim 32, for printing an optically encoded label wherein the shape of said high resolution encoded data cells represents the data encoded by said high resolution encoded data cells.

36. A label printer in accordance with claim 32, for printing an optically encoded wherein the orientation of said high resolution encoded data cells represents the data encoded by said high resolution encoded data cells.

37. A label printer in accordance with claim 32, for printing an optically encoded label wherein the reflective optical property of said high resolution encoded data cells represents the data enclosed by said high resolution encoded data cells.

38. A label printer in accordance with claim 32, for printing an optically encoded label wherein the size of said high resolution encoded data cells represents the data encoded by said high resolution encoded data cells.

* * * * *